US011537210B2

(12) United States Patent
Baijal et al.

(10) Patent No.: US 11,537,210 B2
(45) Date of Patent: Dec. 27, 2022

(54) GESTURE-CONTROLLED ELECTRONIC APPARATUS AND OPERATING METHOD THEREOF

(71) Applicant: SAMSUNG ELECTRONICS CO., LTD., Suwon-si (KR)

(72) Inventors: Anant Baijal, Suwon-si (KR); Jaehwang Lee, Suwon-si (KR); Jeongrok Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/334,036

(22) Filed: May 28, 2021

(65) Prior Publication Data
US 2021/0373673 A1    Dec. 2, 2021

(30) Foreign Application Priority Data

May 29, 2020  (KR) .................. 10-2020-0065079
Nov. 19, 2020 (KR) .................. 10-2020-0155423

(51) Int. Cl.
G06F 3/01      (2006.01)
G06T 7/90      (2017.01)
(Continued)

(52) U.S. Cl.
CPC .......... G06F 3/017 (2013.01); G06F 3/1454 (2013.01); G06T 7/90 (2017.01); G06T 11/001 (2013.01);
(Continued)

(58) Field of Classification Search
CPC . G06F 3/017; G06F 3/167; G06F 3/01; G06F 3/1454; G06T 7/90; G06T 11/001;
(Continued)

(56) References Cited

U.S. PATENT DOCUMENTS 9,928,634 B2   3/2018  Cao et al.
10,101,846 B2  10/2018 Sarnoff
(Continued)

FOREIGN PATENT DOCUMENTS

KR  10-2012-0092034 A   8/2012
KR  10-2019-0038422 A   4/2019

OTHER PUBLICATIONS

International Search Report and Written Opinion dated Apr. 20, 2021 issued by the International Searching Authority in International Application No. PCT/KR2021/000826 (PCT/ISA/220, PCT/ISA/210, and PCT/ISA/237).

Primary Examiner — Tom V Sheng
(74) Attorney, Agent, or Firm — Sughrue Mion, PLLC

(57) ABSTRACT

An electronic apparatus including a processor configured to analyze at least one of an input image or an captured image and obtain a recommended color distribution including at least one color based on the at least one of the input image or the captured image, the captured image being obtained by capturing an image of an environment; display the input image on a display, obtain a hand image by capturing an image of a hand of a user and generate a magic hand by mapping a color to the obtained hand image based on the recommended color distribution, and detect a gesture of the hand of the user and control colors of the input image displayed on the display based on the detected hand gesture and a color mapping of the magic hand.

20 Claims, 31 Drawing Sheets

(51) Int. Cl.
*G06F 3/14* (2006.01)
*G06T 11/00* (2006.01)
*G06F 3/16* (2006.01)

(52) U.S. Cl.
CPC .... *G06F 3/167* (2013.01); *G06T 2207/10024* (2013.01); *G06T 2207/20084* (2013.01); *G09G 2354/00* (2013.01)

(58) Field of Classification Search
CPC .......... G06T 2207/10024; G06T 2207/20084; G09G 2354/00
USPC ........................................................ 345/156
See application file for complete search history.

(56) References Cited

U.S. PATENT DOCUMENTS

| | | |
|---|---|---|
| 10,325,407 B2 | 6/2019 | Lanier et al. |
| 2011/0110560 A1* | 5/2011 | Adhikari ................ G06V 40/20 382/103 |
| 2014/0022164 A1* | 1/2014 | Adhikari ................ G06V 40/28 345/156 |
| 2014/0028550 A1* | 1/2014 | Adhikari ............... G06F 3/0304 345/156 |
| 2016/0092726 A1* | 3/2016 | Li ........................ G06V 20/695 345/156 |
| 2018/0075657 A1 | 3/2018 | Lanier et al. |
| 2019/0101996 A1 | 4/2019 | Lawrence |
| 2019/0220109 A1 | 7/2019 | Bernstein et al. |
| 2019/0266798 A1 | 8/2019 | Ngai et al. |
| 2021/0149559 A1 | 5/2021 | Seo et al. |

* cited by examiner

GESTURE-CONTROLLED ELECTRONIC APPARATUS AND OPERATING METHOD THEREOF

CROSS-REFERENCE TO RELATED APPLICATION

This application is based on and claims priority under 35 U.S.C. § 119 to Korean Patent Application No. 10-2020-0065079, filed on May 29, 2020, and Korean Patent Application No. 10-2020-0155423, filed on Nov. 19, 2020, in the Korean Intellectual Property Office, the disclosures of which are incorporated by reference herein in their entirety.

BACKGROUND

1. Field

The disclosure relates to a gesture-controlled electronic apparatus and an operating method of the electronic apparatus, and more particularly to an electronic apparatus for performing a function of controlling processing of an image displayed on the electronic apparatus by using a hand gesture of a user, and an operating method of the electronic apparatus.

2. Description of Related Art

A display device has a function of displaying an image viewable by a user. A user may view a broadcast by using a display device. A display device displays, on a display, a broadcast selected by a user from among broadcast signals from a broadcast station.

In addition to a digital broadcast function, smart televisions (TVs) providing various contents are currently used. Smart TVs perform not only an operation of passively displaying content selected by a user, but reinforce interactive characteristics with respect to users and provide diverse functions to the users.

Also, recently developed display devices may also perform an operation of generating content through interaction with a user, in addition to a simple function of displaying content.

SUMMARY

Provided are an electronic apparatus that allows a user to intuitively control image processing by using a hand gesture of the user and an operating method of the electronic apparatus.

According to an aspect of the disclosure, an electronic apparatus may include a memory storing at least one instruction; and at least one processor configured to execute the at least one instruction stored in the memory to: analyze at least one of an input image or a captured image and obtain a recommended color distribution including at least one color based on the at least one of the input image or the indoor image, the captured image being obtained by capturing an image of an environment of the electronic apparatus; display the input image on a display, obtain a hand image by capturing an image of a hand of a user and generate a magic hand by mapping a color to the obtained hand image based on the recommended color distribution, and detect a gesture of the hand of the user and control colors of the input image displayed on the display based on the detected hand gesture and a color mapping of the magic hand.

The at least one processor may be further configured to execute the at least one instruction to obtain the recommended color distribution based on the at least one of the input image or the captured image by using at least one neural network.

The recommended color distribution may include at least one of a color distribution obtained by reflecting a color distribution of the captured image to a color distribution obtained from the input image, a color distribution obtained from the captured image, or a color distribution obtained from the input image.

The at least one processor may be further configured to execute the at least one instruction to: convert, based on the input image being a color image, the input image expressed in color into a black and white image; and control the display to display the black and white image.

The at least one processor may be further configured to execute the at least one instruction to perform an operation of at least one of modifying, adding, or removing at least one color mapped to the magic hand, according to a user input.

The at least one processor may be further configured to execute the at least one instruction to control the display to display a preview image of the magic hand.

The at least one processor may be further configured to execute the at least one instruction to: generate a plurality of magic hands; and control the display to display a plurality of preview images of the plurality of magic hands on the display. Each of the plurality of magic hands may respectively correspond to different users.

The at least one processor may be further configured to execute the at least one instruction to: detect interaction gestures of hands of the different users respectively corresponding to the plurality of magic hands; and provide color effects to each of the plurality of magic hands displayed on the display according to the detected interaction gestures.

The at least one processor may be further configured to execute the at least one instruction to: share, via screen sharing, the input image with an external apparatus that is remotely connected; perform color control on at least a portion of the shared input image according to a hand gesture of the user of the electronic apparatus; receive a color display of at least another portion of the input image which has colors that are controlled according to a hand gesture of a user of the external apparatus; and control the display to display the color display.

The at least one processor may be further configured to execute the at least one instruction to update the magic hand by analyzing a feature of at least a partial region of the input image on which a picture is drawn, based on a gesture of the hand of the user, and modifying at least one color mapped to the magic hand based on the feature.

According to another aspect of the disclosure, an operating method of an electronic apparatus may include analyzing at least one of an input image or a captured image and obtaining a recommended color distribution including at least one color based on the at least one of the input image or the captured image, wherein the captured image is obtained by capturing an image of an environment of the electronic apparatus; displaying the input image on a display; obtaining a hand image by capturing an image of a hand of a user and generating a magic hand by mapping a color to the obtained hand image based on the recommended color distribution; and detecting a gesture of the hand of the user and controlling processing of the input image displayed on the display based on the detected hand gesture and a color mapping of the magic hand.

The method may further include obtaining the recommended color distribution based on the at least one of the input image or the captured image by using at least one neural network.

The recommended color distribution may include at least one of a color distribution obtained by reflecting a color distribution of the captured image to a color distribution obtained from the input image, a color distribution obtained from the captured image, or a color distribution obtained from the input image.

The method may further include converting, based on the input image being a color image, the input image expressed in color into a black and white image; and displaying the black and white image.

The method may further include performing an operation of at least one of modifying, adding, or removing at least one color mapped to the magic hand, according to a user input.

The method may further include generating a plurality of magic hands; and displaying a plurality of preview images of the plurality of magic hands on the display. The plurality of magic hands may respectively correspond to different users.

The method may further include detecting interaction gestures of hands of the different users respectively corresponding to the plurality of magic hands; and providing color effects to each of the plurality of magic hands displayed on the display according to the detected interaction gestures.

The operating method may further include sharing, via screen sharing, the input image with an external apparatus that is remotely connected; performing color control on at least a portion of the shared input image according to a hand gesture of the user of the electronic apparatus; receiving a color display of at least another portion of the input image which has colors that are controlled according to a hand gesture of a user of the external apparatus; and displaying the color display.

The method may further include updating the magic hand by analyzing a feature of at least a partial region of the input image on which a picture is drawn, based on a gesture of the hand of the user, and modifying at least one color mapped to the magic hand based on the feature.

According to another aspect of the disclosure, a non-transitory computer-readable recording medium may have recorded thereon an operating method of an electronic apparatus. The operating method of the electronic apparatus may include analyzing at least one of an input image or a captured image and obtaining a recommended color distribution including at least one color based on at least one of the input image or the captured image, wherein the captured image is obtained by capturing an image of an environment; displaying the input image on a display; obtaining a hand image by capturing an image of a hand of a user and generating a magic hand by mapping a color to the obtained hand image based on the recommended color distribution; and detecting a gesture of the hand of the user and controlling processing of the input image displayed on the display based on the detected hand gesture and a color mapping of the magic hand.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
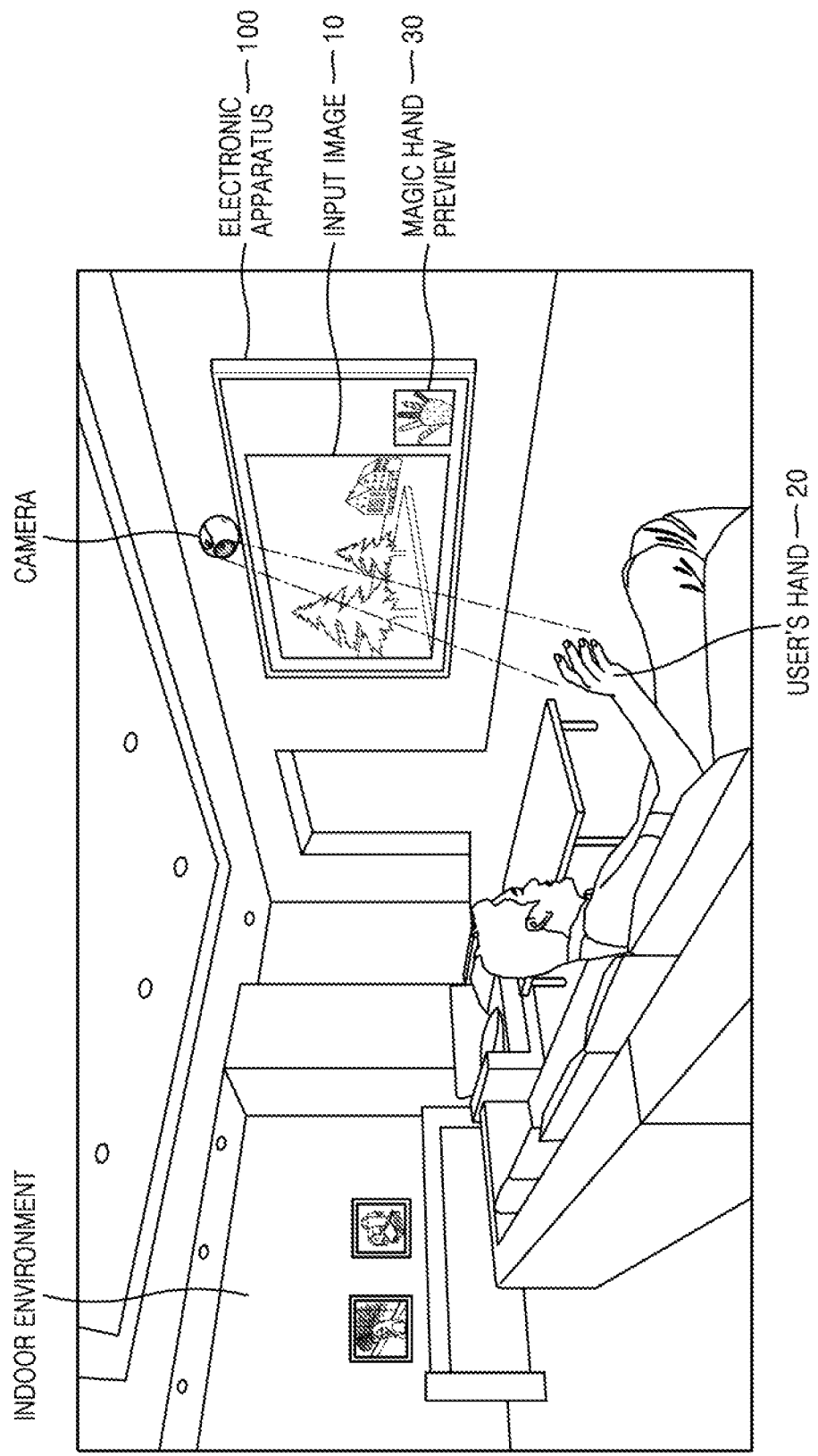
FIG. 1 is a reference diagram for describing the concept of a method of controlling image processing based on a gesture of a user, according to an embodiment.

Hereinafter, the terms used in the specification will be briefly described, and then the disclosure will be described in detail.

The terms used in this disclosure are general terms currently widely used in the art in consideration of functions in regard to the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the disclosure should be understood not as simple names but based on the meaning of the terms and the overall description of the disclosure.

Throughout the specification, when a portion "includes" an element, another element may be further included, rather than excluding the existence of the other element, unless otherwise described. In addition, terms such as " . . . unit", " . . . module", or the like refer to units that perform at least one function or operation, and the units may be implemented as hardware or software or as a combination of hardware and software.

Throughout the disclosure, the expression "at least one of a, b or c" indicates only a, only b, only c, both a and b, both a and c, both b and c, all of a, b, and c, or variations thereof.

Hereinafter, the disclosure will now be described more fully with reference to the accompanying drawings, in which embodiments of the disclosure are shown such that one of ordinary skill in the art may easily work the disclosure. This disclosure may, however, be embodied in many different forms and should not be construed as limited to the embodiments of the disclosure set forth herein. Also, elements not related to description are omitted in the drawings for clear description of the disclosure, and like reference numerals in the drawings denote like elements throughout the specification.

According to embodiments, the term "user" may refer to a person who controls a function or an operation of a display device by using a control device, and may include a viewer, an administrator, or an installation engineer.

According to embodiments, the term "magic hand" may refer to an image generated by mapping at least one color to a hand image of a user.

According to embodiments, the term "magic hand function" may refer to a function of controlling image processing by using a magic hand.

According to embodiments, the term "magic hand function module" may include an appropriate logic, circuit, interface, and/or code that is operable to perform a magic hand function.

FIG. 1 is a reference diagram for describing the concept of a method of controlling image processing based on a gesture of a user according to an embodiment.

Referring to FIG. 1, an electronic apparatus 100 may obtain at least one of an input image 10 or an indoor image.

According to an embodiment, the input image 10 may be a color image or a black and white image.

According to an embodiment, the electronic apparatus 100 may obtain the input image 10 from an external apparatus such as a portable device of a user, from a storage of the electronic apparatus 100, or from a server computer.

According to an embodiment, the electronic apparatus 100 may obtain an indoor image by capturing an image of an indoor environment by using a camera or receive an indoor image obtained by capturing an image by using a portable device of a user, from the portable device.

The electronic apparatus 100 may obtain a recommended color distribution based on at least one of an input image or an indoor image by analyzing at least one of the input image or the indoor image.

According to an embodiment, the electronic apparatus 100 may obtain a recommended color distribution based on at least one of an input image or an indoor image by analyzing at least one of the input image or the indoor image by using a neural network using artificial intelligence (AI) or a rule-based algorithm. The recommended color distribution may include information about at least one color and information about a proportion of the at least one color.

According to an embodiment, when the electronic apparatus 100 obtains an input image, the electronic apparatus 100 may obtain a recommended color distribution based on the input image, by analyzing the obtained input image. For example, a recommended color distribution based on an input image may include information about at least one color included in an input image and information about a proportion of the at least one color in the input image.

According to an embodiment, when an input image is a black and white image, the electronic apparatus 100 may infer, from the input image by using a neural network using AI, a recommended color distribution corresponding to the input image. As described above, also when an input image is a black and white image, a recommended color distribution suitable for a shape of an object included in the input image which is a black and white image may be obtained by using AI.

According to an embodiment, when the electronic apparatus 100 obtains an indoor image, the electronic apparatus 100 may obtain a recommended color distribution based on the indoor image, by analyzing the indoor image. For example, a recommended color distribution based on an indoor image may include information about at least one color included in the indoor image and information about a proportion of the at least one color in the indoor image. As described above, by capturing an indoor image and obtaining a color distribution from the indoor image, an indoor environment or an indoor mood at a point of time of using a magic hand function may be reflected in colors of the input image. Thus, a user may obtain a color that is adaptively suitable for a current situation or environment. For example, even in a same indoor environment, the mood of the overall colors of an indoor image captured in the morning may be different from that of an indoor image captured in the night, and thus, according to each point of time, a relatively bright and light recommended color distribution may be obtained in the morning or the day, and a relatively dark or heavy recommended color distribution may be obtained in the night.

According to an embodiment, when the electronic apparatus 100 obtains both an input image and an indoor image, the electronic apparatus 100 may obtain a recommended color distribution based on the input image and the indoor image, by analyzing the input image and the indoor image. For example, a recommended color distribution based on an input image and an indoor image may include information about at least one color included in the input image and the indoor image and information about a proportion of the at least one color in the input image and the indoor image. For example, a recommended color distribution based on an input image and an indoor image may include information about a recommended color distribution based on the input image, the information being modified by reflecting information about a recommended color distribution based on the indoor image. As another example, a recommended color distribution based on an input image and an indoor image may include information about a recommended color distribution based on the indoor image, the information being modified by reflecting information about a recommended color distribution based on the input image.

The electronic apparatus 100 may obtain an image of a user's hand 20 and generate a magic hand by mapping at least one color to a hand image of the user by using a recommended color distribution.

According to an embodiment, the electronic apparatus 100 may display the magic hand on a portion of a display of the electronic apparatus 100 as a magic hand preview image 30. By providing information about a color mapped to a user's hand by displaying a preview image of a magic hand on a display as described above, a guide on controlling image processing may be provided to a user.

According to an embodiment, the electronic apparatus 100 may generate a magic hand by mapping at least one color to a hand image of a user by using information about at least one color included in a recommended color distribution and information about a proportion of each color. For example, when a red color is indicated as 50% in a recommended color distribution, the electronic apparatus 100 may generate a magic hand by mapping the red color to a region of 50% of the entire region of a hand image of a user.

According to an embodiment, the electronic apparatus 100 may control such that a color mapped to a magic hand generated using a recommended color distribution is modified via a user input.

According to an embodiment, the electronic apparatus 100 may map a color mapped to a magic hand to a hand image by using a color selected according to a user input, without using a recommended color distribution.

According to an embodiment, the electronic apparatus 100 may adaptively and continuously update a color mapped to a magic hand, by reflecting a result of controlling processing of an input image.

According to an embodiment, the electronic apparatus 100 may generate at least one magic hand and display at least one magic hand preview image on a display. For example, at least one magic hand may include a magic hand corresponding to the left hand of a user and a magic hand corresponding to the right hand of the user. For example, at least one magic hand may include a magic hand corresponding to at least one user. For example, one magic hand may include a magic hand corresponding to a hand of a father, and the other one may include a magic hand corresponding to a hand of a child.

According to an embodiment, the electronic apparatus 100 may store a generated magic hand in a storage and read and use the magic hand stored in the storage according to selection by a user.

The electronic apparatus 100 may display the input image 10 on the display.

According to an embodiment, when an input image is a black and white image, the electronic apparatus 100 may display the input image which is a black and white image, on the display without any change.

According to an embodiment, when an input image is a color image, the electronic apparatus 100 may convert the input image which is a color image, into a black and white image and display the black and white image on a display.

According to an embodiment, when there is no input image, the electronic apparatus 100 may display a blank image on the display. In this case, a user may draw a picture on a blank screen by using the electronic apparatus 100 like drawing a picture on a piece of white drawing paper.

The electronic apparatus 100 may obtain a gesture of the user's hand 20 by using a camera, and control processing of the input image 10 displayed on the display based on the obtained hand gesture and a magic hand. Control of processing of an input image may include control of coloring an image, modifying a color of an image, drawing a shape on an image, and generating an image, or the like.

According to an embodiment, the electronic apparatus 100 may detect a gesture of the user's hand 20 by capturing an image of the user's hand 20 by using a camera and control a magic hand according to the detected hand gesture.

According to an embodiment, the electronic apparatus 100 may select a color to be used in control of colors of an input image from among at least one color mapped to a magic hand, according to a detected hand gesture.

According to an embodiment, the electronic apparatus 100 may modify a color to be used in control of colors of an input image from among at least one color mapped to a magic hand, according to a detected hand gesture.

According to an embodiment, the electronic apparatus 100 may modify a property of a color mapped to a magic hand according to a detected hand gesture. For example, the property of a color may include brightness or chroma of the color.

According to an embodiment, the electronic apparatus 100 may control color processing of an input image displayed on the display of the electronic apparatus 100 according to a detected hand gesture. For example, the electronic apparatus 100 may select a red color from among at least one color mapped to a magic hand according to a detected hand gesture, as a color to be used in control of colors of an input image, and may control color processing of the input image by using the red color according to the detected hand gesture. For example, when an input image is a blank image, that is, when there is no input image, the electronic apparatus 100 may control image processing such that a drawing is done on a blank screen by using a selected color according to a detected hand gesture.

According to an embodiment, the electronic apparatus 100 may control a color mapped to a magic hand corresponding to hands of multiple users according to a gesture interacting with the hands of the multiple users. For example, an interacting gesture may include gestures that allow body parts related to hands of multiple users such as finger, the back of one's hand, palm, or elbow to interact with each other. For example, the electronic apparatus 100 may perform control of allowing, through a high-five of the hands of the two users, colors of two magic hands respectively corresponding to the hands of two users to be exchanged with each other or the colors of the two magic hands to be mixed with each other.

According to an embodiment, the electronic apparatus 100 may generate a plurality of magic hands respectively corresponding to hands of multiple users and control processing of an input image displayed on a display through cooperation of the multiple users based on hand gestures of the multiple users and magic hands corresponding to the hands of the users. For example, the electronic apparatus 100 may generate a magic hand corresponding to a mother and a magic hand corresponding to a child, and control processing of an input image based on a hand gesture and the magic hand of the mother and a hand gesture and the magic hand of the child. Accordingly, the mother and the child may cooperate to color an input image displayed on the display of the electronic apparatus 100.

According to an embodiment, the electronic apparatus 100 may control processing of an input image based on magic hands and hand gestures of users who are remote from each other, via screen sharing. For example, electronic apparatuses that are remote from each other may be connected to one another via a communication network and share an input image via screen sharing and display the input image on each display. Also, an input image processing control result obtained based on a hand gesture and a magic hand of a user of the first electronic apparatus may be transmitted to a second electronic apparatus in real time, and an input image processing control result obtained based on a hand gesture and a magic hand of a user of the second electronic apparatus may be transmitted from the second electronic apparatus to the first electronic apparatus in real time, and accordingly, a user experience that resembles controlling processing of an input image through cooperation between a first user and a second user may be obtained.

According to an embodiment, the electronic apparatus 100 may receive from a user a voice command instructing an input image processing function by using a magic hand and perform the input image processing function by using a magic hand by recognizing the received voice command. For example, a user may input a voice command such as "show me a tree image" or "magic hand" to the electronic apparatus 100 to use a magic hand function. By allowing the user to give an instruction related to a magic hand by using a voice command, a user may use a magic hand function conveniently. In particular, young users who use the magic hand function may approach the magic hand function conveniently.

According to an embodiment, the electronic apparatus 100 may update at least one color mapped to a magic hand based on properties of a partial region of an input image processed according to a magic hand and a hand gesture of a user. The properties of the partial region may include various features of an image such as a shape or a size of an object drawn on the partial region of the image or a color or texture used in the partial region. For example, when a user has processed a partial region of an input image by using a certain color tone, the electronic apparatus 100 may modify or update at least one color mapped to a magic hand by reflecting the properties of the color tone processed in the partial region. By adaptively updating a magic hand in a direction in which a user intends to control image processing, as described above, a convenient and fun user experience may be provided to the user.

According to an embodiment, the electronic apparatus 100 may upload a generated magic hand or a user created content generated using the magic hand to a cloud by transmitting the magic hand or the user created content to a server computer, and may also receive a magic hand generated by another user or a user created content generated by another user, from a server computer. Accordingly, a user may access abundant magic hand-related contents and usability of the server computer may be extended.

As image processing by using a magic hand generated based on an indoor image or an input image is controllable as described above, intuitive user experience may be provided to the user.

Operation of an interactive drawing painting application may be difficult for both adults and children, especially for children of a certain age and/or children with certain abilities. For example, when drawing or coloring an image, it may be difficult to interactively select a color from a color panel due to the limitations of interaction techniques. Also, some children may not know which color combinations can produce better output. Also, it may be difficult to select from numerous color combinations. Furthermore, children may not be intuitive as to how to draw in different colors (using different brushes) at the same time. Children generally like technology that is fun and can help their creative minds through innovation in technology, usability and/or the overall user experience. Implementation of the embodiments may include analyzing content (image) and/or rooms (context) using an AI model to recommend an appropriate color combination. Next, at least one recommended color proportional to a probability value may be mapped to a hand region. The higher a color probability value, the more region may be occupied by the hand. To help a user, a preview image of a color-mapped magic hand may be displayed on a screen to inform the user. By having a preview provided, the user may conveniently control processing of an image by using a color-mapped hand gesture. The above-described user interface (Up-user experience (UX) may increase intuitiveness and usability of the interactive drawing painting experience by using a magic hand. Color mapping of a magic hand may be continuously adapted to an image being controlled.

Figure 2:
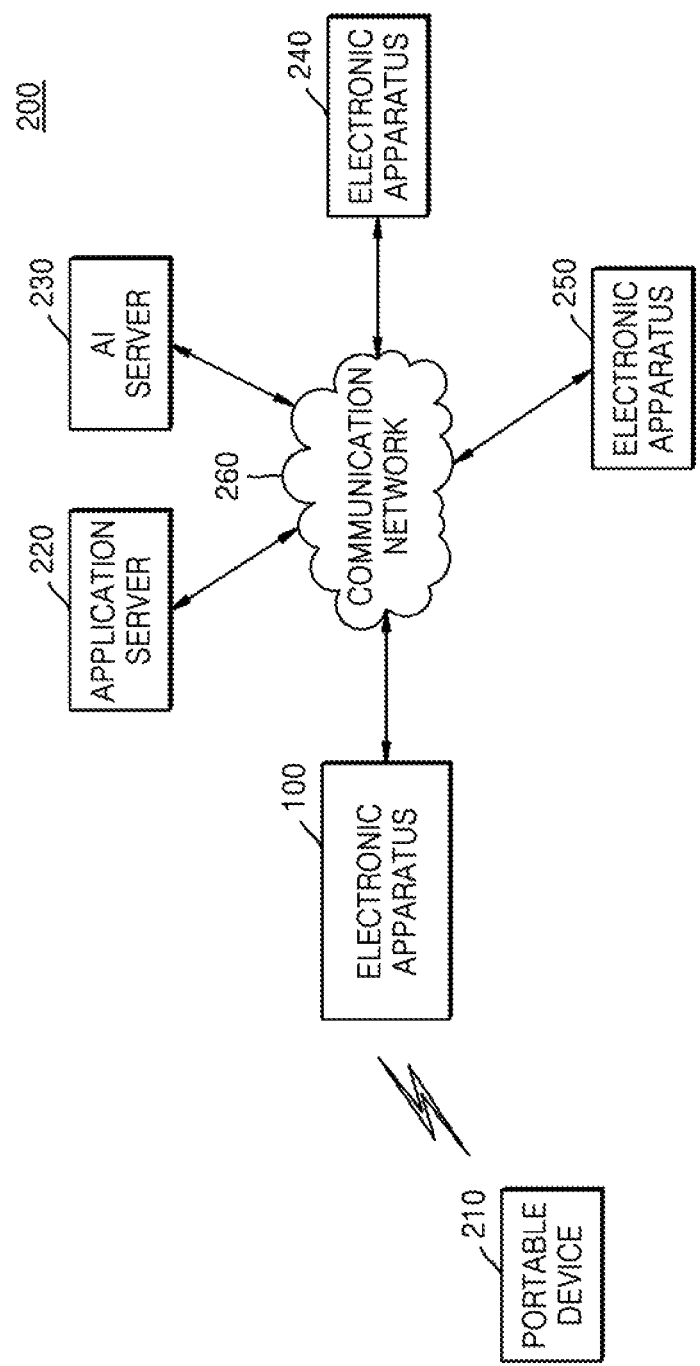
FIG. 2 shows an example of a system to which a method of controlling image processing based on a gesture of a user is applied, according to an embodiment.

FIG. 2 shows an example of a system to which a method of controlling image processing based on a gesture of a user, according to an embodiment, is applied.

Referring to FIG. 2, a system 200 according to an embodiment may include an electronic apparatus 100, a portable device 210, an application server 220, an AI server 230, an electronic apparatus 240, an electronic apparatus 250, and a communication network 260.

According to an embodiment, the electronic apparatus 100 may perform a function of controlling image processing based on a user's gesture. For example, in the electronic apparatus 100, a magic hand function application that controls image processing based on a user's gesture may be installed, or the magic hand function application may be downloaded from the application server 220 and installed by accessing the application server 220 through the communication network 260.

According to an embodiment, the electronic apparatus 100 may obtain an input image used in a magic hand function by receiving the input image from the portable device 210, by obtaining the input image from a storage provided in the electronic apparatus 100, or by receiving the input image from the application server 220.

According to an embodiment, the electronic apparatus 100 may obtain an indoor image used in a magic hand function by receiving the indoor image from the portable device 210 or by capturing an indoor image by using a camera provided in the electronic apparatus 100.

According to an embodiment, when the electronic apparatus 100 obtains a recommended color distribution by analyzing an input image or an indoor image in a magic hand function, the electronic apparatus 100 may obtain the recommended color distribution by using an AI-based neural network provided in the electronic apparatus 100, or by transmitting at least one of an input image or an indoor image to the AI server 230 and receiving, from the AI server 230, a recommended color distribution extracted by analyzing the input image or the indoor image from the AI server 230.

According to an embodiment, the electronic apparatus 100 may perform a magic hand function in cooperation with the electronic apparatus 240 or 250 that is remotely located, by using screen sharing. For example, the electronic apparatus 100 and the electronic apparatus 240 may be connected with each other via communication through the communication network 260 and display a same input image through screen sharing. The electronic apparatus 100 may transmit a result of an input image processing control performed based on a user's gesture and a magic hand of the electronic apparatus 100 to the electronic apparatus 240 in real time. The electronic apparatus 240 may transmit a result of an input image processing control performed based on a user's gesture and a magic hand of the electronic apparatus 240 to the electronic apparatus 100 in real time. As such, the electronic apparatus 100 not only displays the image processing control result of the user of the electronic apparatus 100, but also displays the image processing control result of the user of the electronic apparatus 240 at the same time, thereby rendering an effect resembling image processing control of an input image, performed through cooperation of two users.

According to an embodiment, the electronic apparatus 100 may store a magic hand generated using a magic hand function or an input image processing control result obtained using a magic hand, in a storage of the electronic apparatus 100, and may also upload the generated magic hand or the input image processing control result to the application server 220 via the communication network 260. As described above, the magic hand or input image processing control result generated by the electronic apparatus 100 and uploaded to the application server 220 may be downloaded at the request of another user, that is, a user of the electronic apparatus 240 or the electronic apparatus 250. The electronic apparatus 100 may also access the application server 220 and download magic hands or input image processing control results uploaded by other users. The electronic apparatus 100 may use the input image processing control result generated using the magic hand as a background image in an ambient mode of the electronic apparatus 100. In the ambient mode, a display screen of the electronic apparatus 100 is not left as a turned-off, black screen in a state in which the electronic apparatus 100 is not operating a function of the electronic apparatus 100 according to a user input. For example, in a standby mode of the electronic apparatus 100, an information providing mode displaying and providing information such as background images or a user's schedule may be displayed.

The electronic apparatus 100 may be any type of apparatus that includes a processor and a memory and performs a function. The electronic apparatus 100 may be a fixed or portable device. For example, the electronic apparatus 100 may include various electronic apparatuses such as computers including desktops, laptops, and tablets, televisions, set-top boxes, smartphones, cellular phones, game players, music players, video players, medical equipment, and home appliances.

The communication network 260 may support various types of communication protocols such as Wi-Fi (e.g., an 802.11 protocol), Ethernet, Bluetooth, Bluetooth Low Energy (BLE), transmission control protocol/internet protocol (TCP/IP), hypertext transfer protocol (HTTP), file transfer protocol (FTP), real-time transport protocol (RTP), real-time streaming protocol (RTSP), Global System for Mobile Communications (GSM), GSM plus Enhanced Data rates for GSM Evolution (EDGE), Code Division Multiple Access (CDMA), Orthogonal Frequency-Division Multiple Access (OFDMA), or high speed packet access (HSPA).

Figure 3:
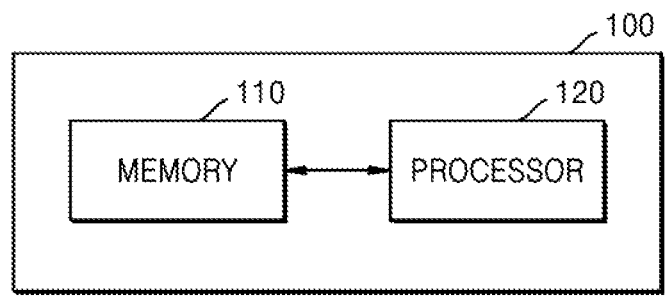
FIG. 3 is a schematic block diagram of an electronic apparatus according to an embodiment.

FIG. 3 is a schematic block diagram of an electronic apparatus according to an embodiment of the disclosure.

Referring to FIG. 3, the electronic apparatus 100 may include a memory 110 and a processor 120. However, the electronic apparatus 100 may be implemented by more components than the illustrated components, and is not limited to the above-described example.

The memory 110 according to an embodiment may store a program for processing and controlling by the processor 120, and may store data input to the electronic apparatus 100 or output from the electronic apparatus 100. Although a single memory 110 is shown in FIG. 3, a plurality of memories may also be provided.

The memory 110 may include at least one type of storage medium such as a flash memory type, a hard disk type, a multimedia card micro type, a card type memory (e.g., SD or XD memory, etc.), random access memory (RAM), static RAM (SRAM), read-only-memory (ROM), electrically erasable programmable read-only memory (EEPROM), programmable read-only memory (PROM), a magnetic memory, a magnetic disk, and an optical disk.

The processor 120 may control the overall operation of the electronic apparatus 100. For example, the processor 120 may perform a function of the electronic apparatus 100 described in the disclosure by executing at least one instruction stored in the memory 110.

In an embodiment, the processor 120 may control the above-described operations to be performed, by executing at least one instruction stored in the memory 110. In this case, the memory 110 may store at least one instruction executable by the processor 120.

In addition, in an embodiment, the processor 120 may store at least one instruction in a memory provided internally and control such that the above-described operations are performed, by executing at least one instruction stored in the memory provided internally. That is, the processor 120 may perform a certain operation by executing at least one instruction or program stored in an internal memory provided in the processor 120 or stored in the memory 110.

In addition, although a single processor 120 is shown in FIG. 3, a plurality of processors may also be provided. In this case, each of operations performed by an electronic apparatus according to an embodiment may be performed using at least one of a plurality of processors.

According to an embodiment, the electronic apparatus 100 may further include a neural network processor separately. The neural network processor may perform an operation of controlling such that a certain operation is executed, by performing a calculation through a neural network. In detail, in an embodiment, the neural network processor may execute at least one instruction to perform a calculation through the neural network.

According to an embodiment, by executing at least one instruction stored in the memory 110, the processor 120 may analyze at least one of an input image or an indoor image of an indoor environment and obtain a recommended color distribution including at least one color based on at least one of the input image or the indoor image, display the input image on a display, obtain a hand image by capturing an image of a hand of a user, generate a magic hand by mapping a color to the hand image by using the recommended color distribution, detect a gesture of the hand of the user, and control a color of the input image displayed on the display based on the detected gesture of the hand and the magic hand.

According to an embodiment, by executing at least one instruction stored in the memory 110, the processor 120 may obtain a recommended color distribution based on at least one of the input image or the indoor image by using at least one neural network.

According to an embodiment, the recommended color distribution may include at least one of a color distribution obtained by reflecting a color distribution of the indoor image to a color distribution obtained from the input image, a color distribution obtained from the indoor image, or a color distribution of the input image.

According to an embodiment, by executing at least one instruction stored in the memory 110, when the input image is a color image, the processor 120 may convert the input image expressed in color into a black and white image and displays the black and white image on a display.

According to an embodiment, by executing at least one instruction stored in the memory 110, the processor 120 may perform an operation of modifying at least one color mapped to the magic hand, adding a color, and removing a color according to a user input.

According to an embodiment, the processor 120 may display a preview image of the magic hand on the display by executing at least one instruction stored in the memory 110.

According to an embodiment, by executing at least one instruction stored in the memory 110, the processor 120 may generate at least one magic hand and display a preview image of the generated at least one magic hand on the display, and the at least one magic hands may respectively correspond to different users.

According to an embodiment, by executing at least one instruction stored in the memory 110, the processor 120 may detect an interaction gesture of hands of different users respectively corresponding to the plurality of magic hands and provide color effects to each of the plurality of magic hands displayed on the display according to detection of the interaction gesture.

According to an embodiment, by executing at least one instruction stored in the memory 110, the processor 120 may share the input image with a remotely connected external apparatus via screen sharing, and perform control of colors with respect to at least a portion of the input image according to a hand gesture of a user of the electronic apparatus 100, and receive and display colors with respect to at least another portion of the input image, of which colors are controlled according to the hand gesture of the user of the external apparatus.

According to an embodiment, by executing at least one instruction stored in the memory 110, the processor 120 may analyze features of at least a partial region of the input image, on which a picture is drawn, based on a hand gesture of the user, and update the magic hand by modifying at least one color mapped to the magic hand by using the analyzed features.

A function related to obtaining a recommended color distribution based on at least one of an input image or an indoor image by analyzing at least one of the input image or the indoor image by using AI according to an embodiment may be operated using the processor 120 and the memory 110. The processor may include one or more processors. The one or more processors may include a general-purpose processor such as a central processing unit (CPU), an application processor (AP), a digital signal processor (DSP), or the like, a processor dedicated to graphics, such as a graphics processor (GPU) or a vision processor (VPU), or a processor dedicated to AI, such as a neural processing unit (NPU). The one or more processors may control such that input data is processed according to previously defined operating rules or AI models stored in a memory. Alternatively, when the one or more processors include a processor dedicated to AI, the processor dedicated to AI may be designed in a hardware structure specialized for processing of a certain AI model.

The previously defined operating rules or AI models are characterized in that they are created through learning. Here, "created through learning" means that a basic AI model is trained using a plurality of pieces of learning data by using a learning algorithm, so that previously defined operating rules or AI models set to perform a desired characteristic (or purpose) are created. Such learning may be performed in a device on which AI according to an embodiment is performed, or may be performed through a separate server and/or system. Examples of the learning algorithm include supervised learning, unsupervised learning, semi-supervised learning, or reinforcement learning, but are not limited to the above-described examples.

The AI models may include a plurality of neural network layers. Each of the plurality of neural network layers has a plurality of weight values, and performs a neural network operation through an operation between an operation result of a previous layer and an operation between the plurality of weights. The plurality of weights of the plurality of neural network layers may be optimized based on a learning result of the AI models. For example, the plurality of weights may be updated to reduce or minimize a loss value or a cost value obtained from the AI model during a learning process. An artificial neural network may include a deep neural network (DNN), for example, a Convolutional Neural Network (CNN), a Deep Neural Network (DNN), a Recurrent Neural Network (RNN), a Restricted Boltzmann Machine (RBM), a Deep Belief Network (DBM), a Bidirectional Recurrent Deep Neural Network (BRDNN), Deep Q-Networks, and the like, but is not limited to the above-described examples.

According to an embodiment, the electronic apparatus 100 may perform image analysis, generation of a magic hand, and user gesture recognition, and to display a preview of the magic hand generated as above and display an input image, the electronic apparatus 100 may transmit the input image or a magic hand preview image to an externally connected display device, by using an output port or wireless communication for outputting a video/audio signal. For example, the electronic apparatus 100 may include an apparatus such as a set-top box that mainly performs data processing and transmits processed data to an external display device.

Figure 4:
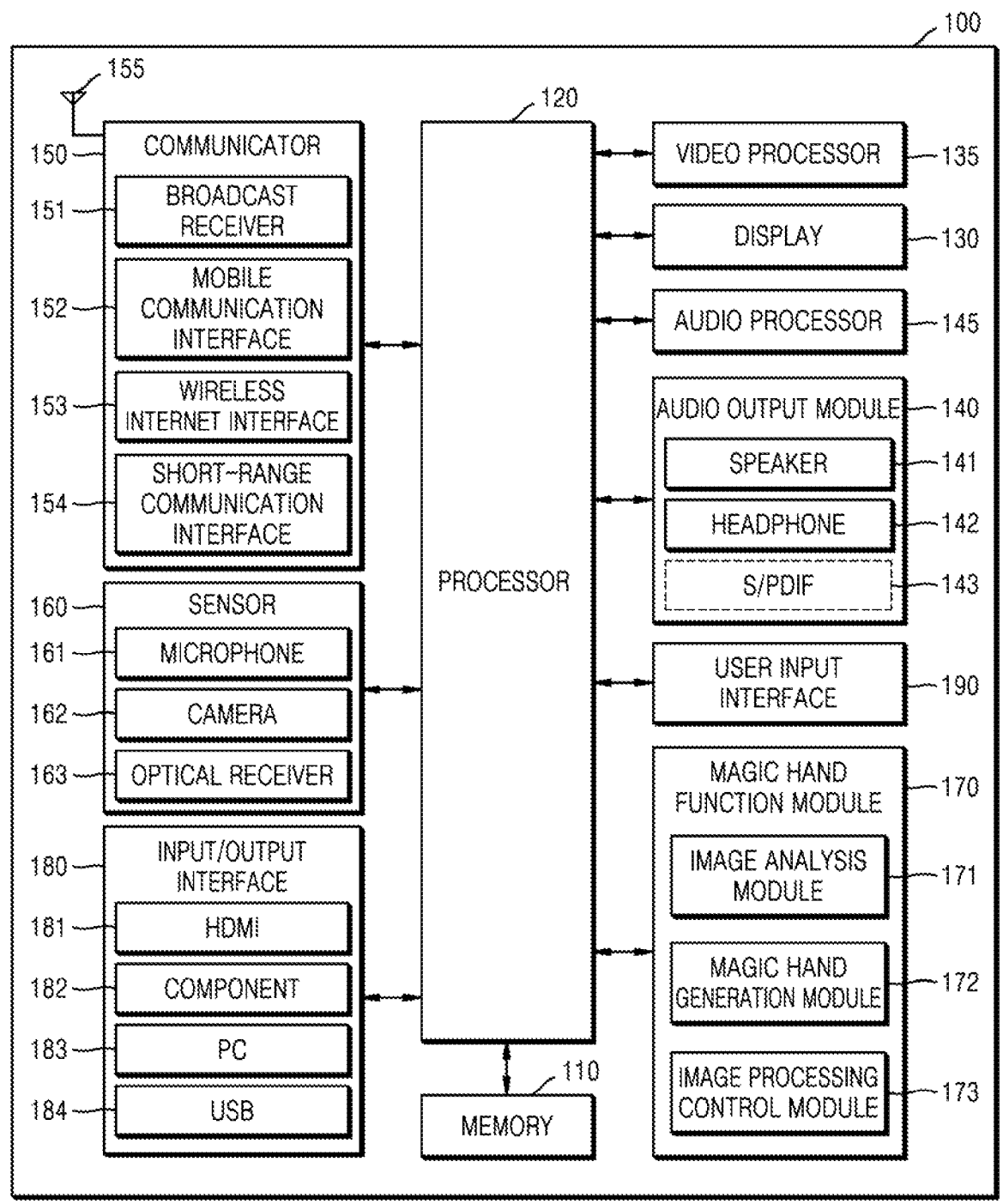
FIG. 4 is a detailed block diagram of an electronic apparatus according to an embodiment.

FIG. 4 is a detailed block diagram of an electronic apparatus according to an embodiment.

In FIG. 4, like elements as those in FIG. 2 are labeled with like reference numerals. Thus, details of the electronic apparatus 100 described above with reference to FIG. 2 will be omitted here.

Referring to FIG. 4, in addition to the memory 110 and the processor 120, the electronic apparatus 100 may further include a display 130, a video processor 135, an audio processor 145, an audio output module 140, a communicator 150, a transmission/reception antenna 155, a sensor 160, an input/output interface 180, and a user input interface 190. The processor 120 may control each component of the electronic apparatus 100 to allow them to perform operations.

Description of the details of the memory 110 and the processor 120 that are described with reference to FIG. 3 will be omitted in the description of FIG. 4.

The display 130 may display an image on a screen according to the control by the processor 120. An image displayed on the screen may be received from the communicator 150, the input/output interface 180, and/or the memory 110.

According to an embodiment, the display 130 may display a magic hand preview generated by the processor 120.

According to an embodiment, the display 130 may display an input image according to an output of the processor 120. When the input image is a color image, the color image may be converted into a black and white image and the black and white image may be displayed.

The video processor 135 may process image data to be displayed via the display 130, and may perform various image processing operations on image data, such as decoding, rendering, scaling, noise filtering, frame rate conversion, and resolution conversion.

The audio processor 145 may perform processing on audio data. In the audio processor 145, various processes such as decoding or amplification, or noise filtering on audio data may be performed.

The audio output module 140 may output audio included in a broadcast signal received from the processor 120, an audio input using the communicator 150 or the input/output interface 180, and/or audio stored in the memory 110. The audio output module 140 may include at least one of a speaker 141, a headphone output terminal 142 or a Sony/Phillips Digital Interface (S/PDIF) output terminal 143.

The transmission/reception antenna 155 may receive a signal transmitted by other devices or transmit a signal to the other devices. While the transmission/reception antenna 155 is shown as a single antenna, a plurality of antennas may also be included. Thus, an electronic apparatus according to an embodiment may support a multiple-input multiple-output (MIMO) system.

The communicator 150 may include at least one module that enables wireless communication between the electronic apparatus 100 and a wireless communication system or between the electronic apparatus 100 and a network in which another electronic apparatus is located. For example, the communicator 150 may include a broadcast receiver 151, a mobile communication interface 152, a wireless Internet interface 153, and a short-range communication interface 154. The communicator 150 may be referred to as a transceiver.

The broadcast receiver 151 may receive a broadcast signal and/or broadcast-related information from an external broadcast management server via a broadcast channel. A broadcast signal may include not only a TV broadcast signal, a radio broadcast signal, and a data broadcast signal, but also a broadcast signal in a form in which a data broadcast signal is combined with a TV broadcast signal or a radio broadcast signal.

The mobile communication interface 152 may transmit and receive a radio signal with at least one of a base station, an external terminal, or a server on a mobile communication network. The radio signal may include a voice call signal, a video call signal, or various types of data according to transmission and reception of text/multimedia messages.

The wireless Internet interface 153 may refer to a module used for wireless Internet access, and may be built in a device or included externally. Examples of wireless Internet technology that may be used include Wireless LAN (WLAN) (WiFi), Wireless broadband (Wibro), World Interoperability for Microwave Access (Wimax), or High Speed Downlink Packet Access (HSDPA). The electronic apparatus 100 may establish a Wi-Fi peer-to-peer (P2P) connection with another device by using the wireless Internet interface 153.

The short-range communication interface 154 may refer to a module for short-range communication. As a short-range communication technology, Bluetooth, Radio Frequency Identification (RFID), infrared data association (IrDA), Ultra Wideband (UWB), ZigBee, and the like may be used.

The sensor 160 may detect a user's voice, a user's image, or a user's interaction, and may include a microphone 161, a camera 162, and an optical receiver 163.

The microphone 161 may receive an uttered voice of a user. The microphone 161 may convert received voice into an electrical signal and output the same to the processor 120.

According to an embodiment, the microphone 161 may receive a user's voice command controlling a magic hand function under the control by the processor 120 and transmit the voice command to the processor 120.

The camera 162 may receive an image corresponding to a user's motion including a gesture within a range of camera recognition (e.g., a continuous frame).

According to an embodiment, the camera 162 may detect a gesture of a user who controls a magic hand under the control by the processor 120 and transmit a signal corresponding to the detected gesture to the processor 120.

The optical receiver 163 may receive an optical signal (including a control signal) received from a remote control device. The optical receiver 163 may receive an optical signal corresponding to a user input (e.g., a touch, pressing, a touch gesture, voice, or motion) from a remote control device. A control signal may be extracted from the received optical signal under the control by the processor 120.

The input/output interface 180 may receive a video (e.g., a moving image, etc.), audio (e.g., voice, music, etc.) and additional information (e.g., electronic program guide (EPG), etc.) from outside of the electronic apparatus 100 according to the control by the processor 120. The input/output interface 180 may include one of a High-Definition Multimedia Interface (HDMI) port 181, component jack 182, a PC port 183, and a Universal Serial Bus (USB) port 184. The input/output interface 180 may include a combination of the HDMI port 181, the component jack 182, the PC port 183, and the USB port 184.

The user input interface 190 may refer to an interface used by a user to input data for controlling the electronic apparatus 100. For example, the user input interface 190 may include a key pad, a dome switch, a touch pad, a jog wheel, a jog switch, and the like, but is not limited thereto.

The memory 110 according to an embodiment may store a program for processing and controlling by the processor 120, and may store data input to the electronic apparatus 100 or output from the electronic apparatus 100. Also, the memory 110 may store data necessary for operation of the electronic apparatus 100.

In addition, programs stored in the memory 110 may be classified into a plurality of modules according to their functions. In detail, the memory 110 may store at least one program for performing a certain operation by using a neural network.

The magic hand function module 170 may include suitable software, logic, circuits, interfaces, and/or codes that are operable to perform a magic hand function disclosed herein.

The magic hand function module 170 may include an image analysis module 171, a magic hand generation module 172, and an image processing control module 173.

The image analysis module 171 may include suitable software, logic, circuits, interfaces, and/or codes that are operable to analyze at least one of an input image or an indoor image to obtain a recommended color distribution based on at least one of the input image or the indoor image. For example, the image analysis module 171 may include an image analysis module 700 shown in FIG. 7, an image analysis module 800 shown in FIG. 8, an image analysis module 900 shown in FIG. 9, an image analysis module 1000 shown in FIG. 10, and the like.

When analyzing at least one of an input image or an indoor image to obtain a recommended color distribution based on at least one of the input image or the indoor image, the image analysis module 171 may use at least one neural network using AI.

According to an embodiment, the image analysis module 171 may be implemented as an independent neural network processor that is different from the processor 120.

According to an embodiment, the image analysis module 171 may use at least one neural network existing in the AI server 230 by communicating with the AI server 230 located outside of the electronic apparatus 100 through a communication network.

Figure 12:
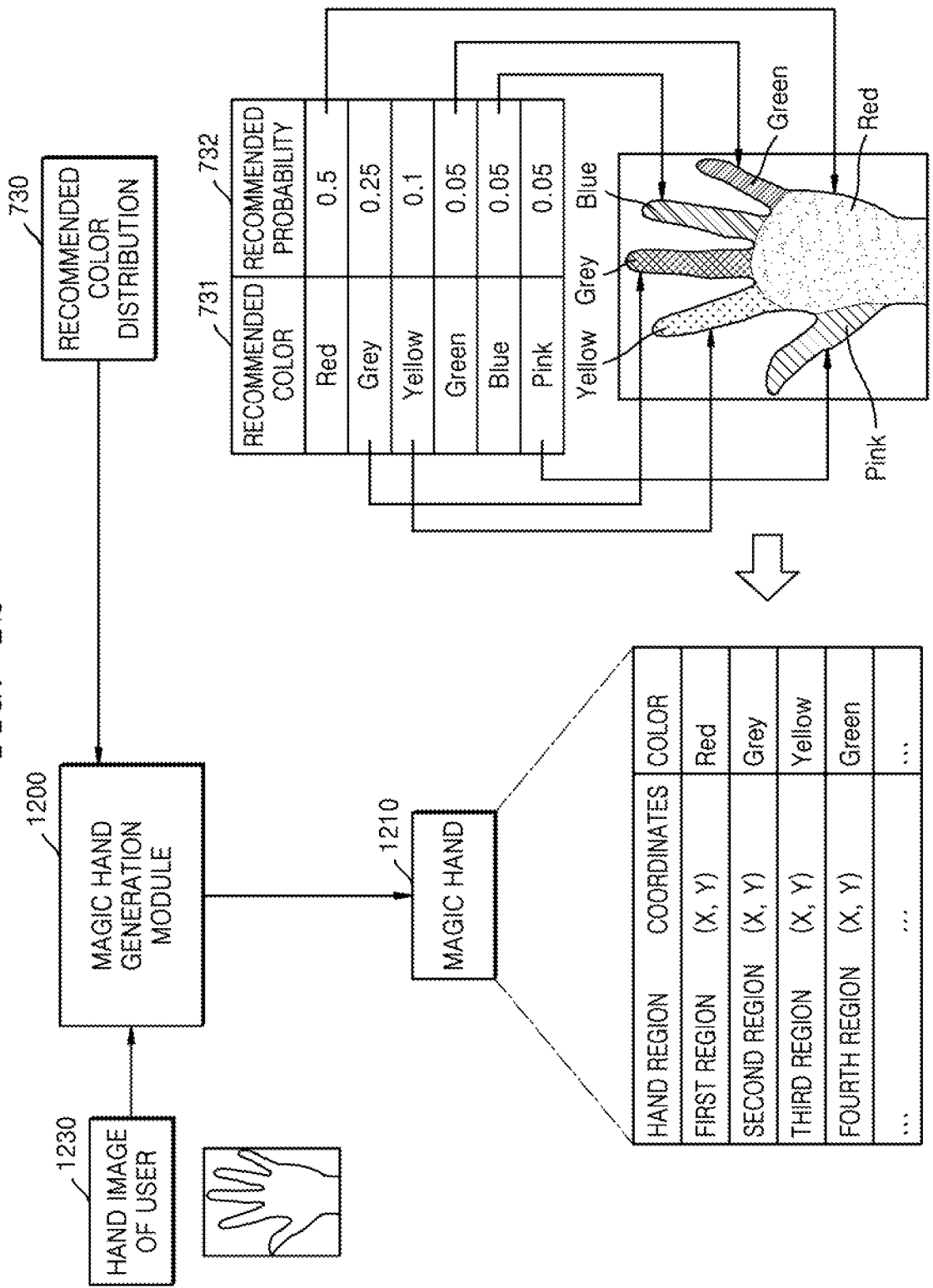
FIG. 12 is a reference diagram for describing a magic hand generation module generating a magic hand by using a hand image of a user and a recommended color distribution, according to an embodiment.

The magic hand generation module 172 may include suitable software, logic, circuits, interfaces, and/or codes that are operable to generate a magic hand by mapping at least one color included in a recommended color distribution, to a hand image of a user. For example, the magic hand generation module 172 may include a magic hand generation module 1200 as shown in FIG. 12.

The image processing control module 173 may include suitable software, logic, circuits, interfaces, and/or codes that are operable to detect a gesture of a hand of a user and control image processing based on the detected gesture and a magic hand. The image processing control module 173 may generate and manipulate graphic data representations of objects to be displayed on a display as an image. The image processing control module 173 may perform control of image processing on a display by recognizing a gesture of a hand of a user and determining a shape of an object or the like in response to the recognized gesture, and by determining a color of the object or the like based on a magic hand to determine the properties of the object to be expressed on a display and generating the object based on the properties and processing the object.

The memory 110 may download and store an application corresponding to the magic hand function module 170 from the application server 220 under the control by the processor 120.

The processor 120 may control the overall operation of the electronic apparatus 100 and a signal flow between internal components of the electronic apparatus 100 and process data. The processor 120 may execute an operation system (OS) stored in the memory 110 and various applications when there is a user input or a preset and stored condition is satisfied.

In addition, the processor 120 may include an internal memory. In this case, at least one of data, programs, or instructions stored in the memory 110 may be stored in an internal memory of the processor 120. For example, the internal memory of the processor 120 may store at least one program for performing certain operations by using a neural network or at least one instruction for performing certain operations by using a neural network.

The block diagrams of the electronic apparatus 100 shown in FIGS. 3 and 4 are a block diagram of an embodiment. Each component of the block diagrams may be integrated, added, or omitted according to the specifications of the electronic apparatus 100 that is actually implemented. For example, when necessary, two or more components may be combined into a single component, or a single component may be divided into two or more components. In addition, functions performed by each block are for explaining embodiments, and specific operations or devices thereof do not limit the scope of the disclosure.

Figure 5:
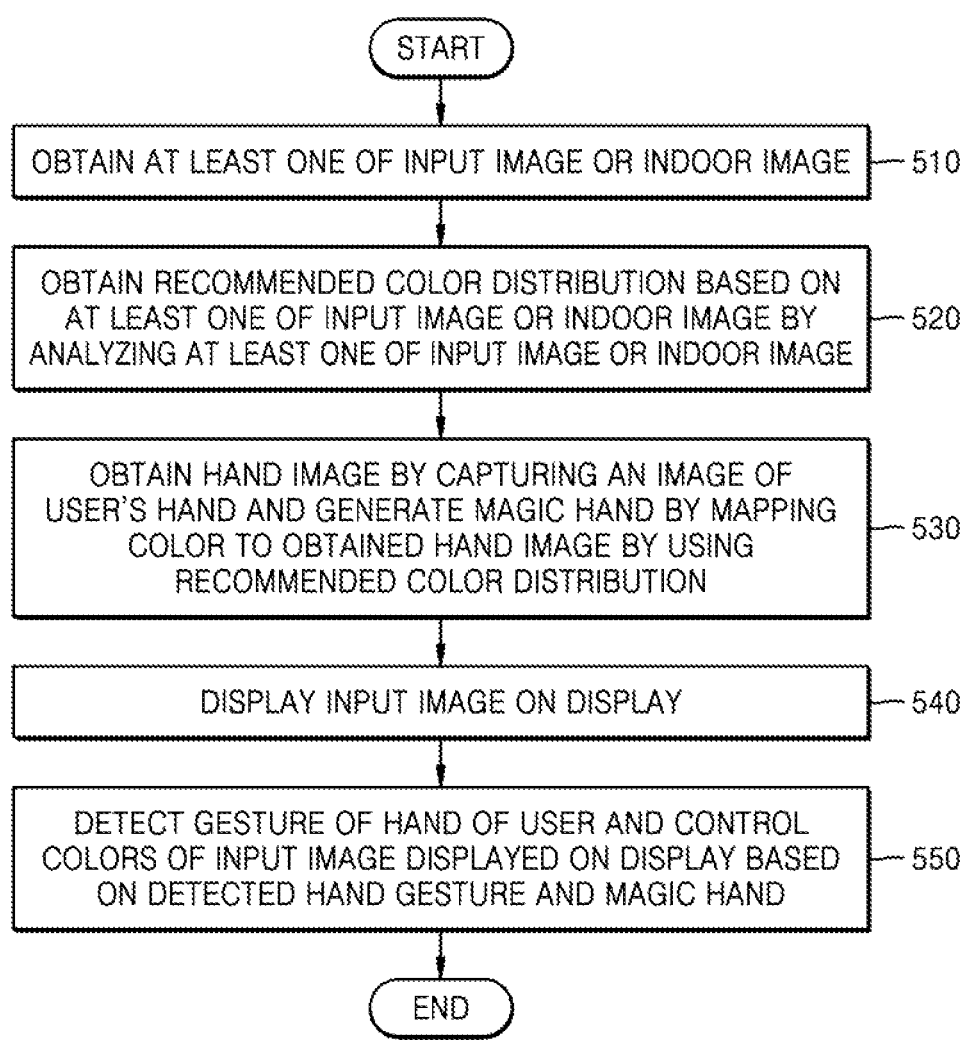
FIG. 5 is a flowchart of an operating method of controlling image processing based on a gesture of a user, by using an electronic apparatus, according to an embodiment.

FIG. 5 is an example of a flowchart of an operating method of controlling image processing based on a gesture of a user, by using an electronic apparatus, according to an embodiment.

Referring to FIG. 5, in operation 510, the electronic apparatus 100 may obtain at least one of an input image or an indoor image.

The input image may include an image subject to image processing control based on a user's gesture, and may be selected by the user. The input image may be a color image or a black and white image.

The indoor image may refer to a photographed image of an indoor environment of a space in which the electronic apparatus 100 is installed, and colors of the indoor image may be used when controlling image processing of the input image.

Figure 6:
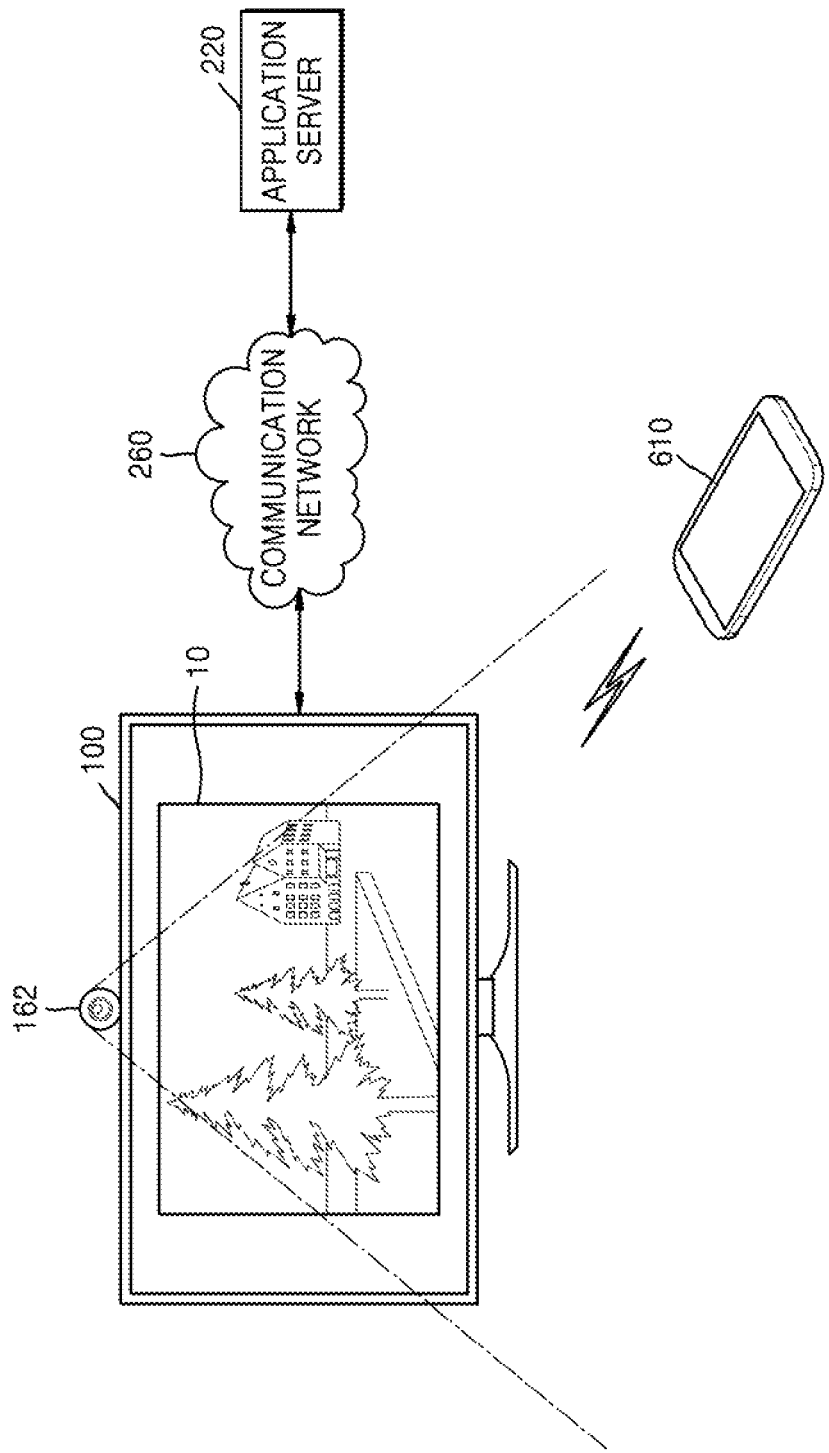
FIG. 6 is a reference diagram for describing a method of obtaining at least one of an input image or an indoor image, by an electronic apparatus, according to an embodiment.

FIG. 6 is a reference diagram for describing a method of obtaining at least one of an input image or an indoor image, by the electronic apparatus 100, according to an embodiment.

Referring to FIG. 6, according to an embodiment, the electronic apparatus 100 may obtain an input image 10 from a portable device 610 such as a user's smart phone, from a storage inside the electronic apparatus 100 according to a user's selection, or from a server computer such as the application server 220 through the communication network 260.

According to an embodiment, the electronic apparatus 100 may obtain an indoor image by using the camera 162 provided in the electronic apparatus 100 or may receive an indoor image captured using the portable device 610 from the portable device 610 according to a user's selection.

By using colors of an image of the indoor environment, an environment in which the user controls image processing of an input image or the atmosphere at the time of image processing control may be adaptively reflected in the control of image processing. For example, when a color distribution of the indoor image is in bright colors, bright colors may be used as colors used in control of processing of the indoor image. For example, even with the same indoor image, the color atmosphere of the indoor image during the day when there is a lot of light may be different from the color atmosphere of the indoor image during the night. Accordingly, even with the same indoor image, the color distribution obtained from an image may be different depending on the point of time of capturing the indoor image, and thus colors used in control of processing of an input image may vary.

In operation 520, the electronic apparatus 100 may obtain a recommended color distribution based on at least one of an input image or an indoor image by analyzing at least one of the input image or the indoor image.

According to an embodiment, the electronic apparatus 100 may obtain a recommended color distribution based on at least one of an input image or an indoor image by analyzing at least one of the input image or the indoor image by using a neural network using AI or a rule-based algorithm. The recommended color distribution may include information about at least one color and information about a proportion of the at least one color. When obtaining a recommended color distribution by using a neural network using AI, compared to using a rule-based algorithm, a recommended color distribution having detailed color representation may be obtained.

Figure 7:
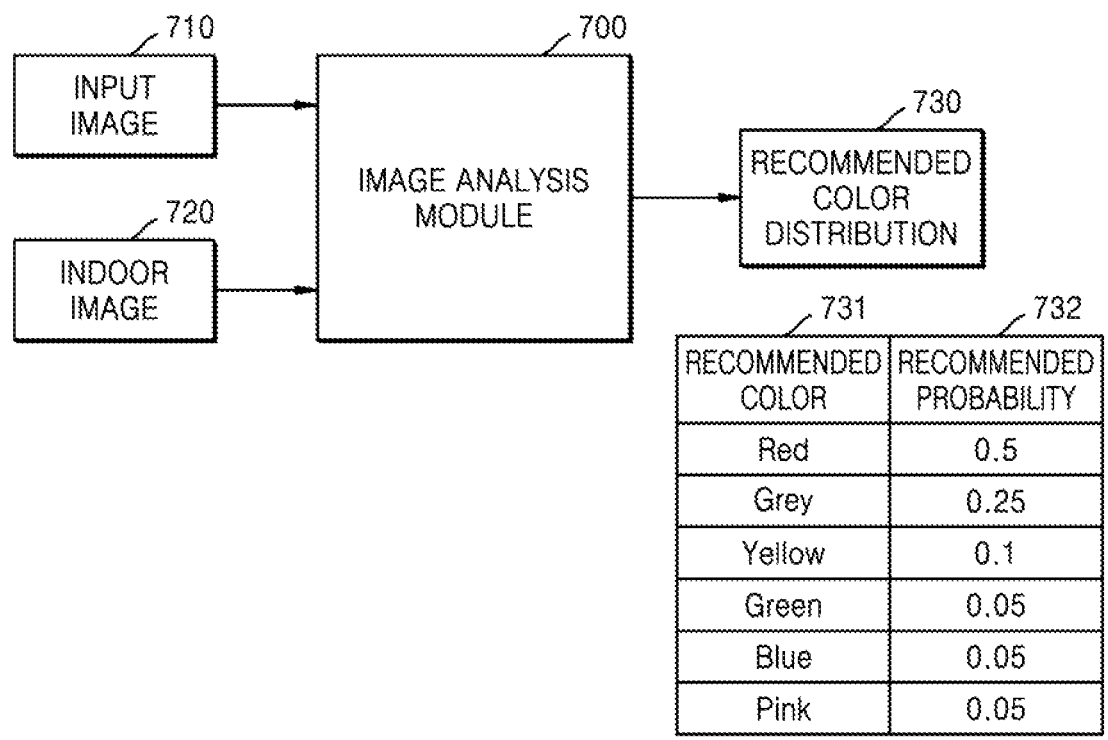
FIG. 7 is a reference diagram for describing an image analysis module obtaining a recommended color distribution by analyzing at least one of an input image or an indoor image, according to an embodiment.

FIG. 7 is a reference diagram for describing a process of an image analysis module obtaining a recommended color distribution by analyzing at least one of an input image or an indoor image, according to an embodiment.

Referring to FIG. 7, an image analysis module 700 may receive at least one of an input image 710 or an indoor image 720, and analyze a distribution of colors included in at least one of the input image 710 or the indoor image 720 to output a recommended color distribution 730 as a result. The image analysis module 700 may analyze an image by using a neural network using AI or may analyze an image by using a rule-based algorithm.

The recommended color distribution 730 output from the image analysis module 700 may include at least one recommended color 731 based on at least one of the input image 710 or the indoor image 720 and a recommendation probability 732 corresponding to each recommended color. The recommended color 731 may be shown by the name of the color, and the recommendation probability 732 may be represented by a probability whereby each color is recommended. For example, referring to FIG. 7, as an example of a recommended color distribution, the recommended color 731 includes Red, Gray, Yellow, Green, Blue, and Pink, and 0.5, 0.25, 0.1, 0.05, 0.05 and 0.05 are indicated as respectively corresponding recommendation probabilities. Accordingly, according to the example of the recommended color distribution, the red color having a recommendation probability of 0.5 represents a main color recommended from an input image or an indoor image, and a next main color is a gray color with a recommendation probability of 0.25.

The electronic apparatus 100 may obtain a recommended color distribution based on an input image, a recommended color distribution based on an indoor image, or a recommended color distribution based on an input image and an indoor image.

Figure 8:
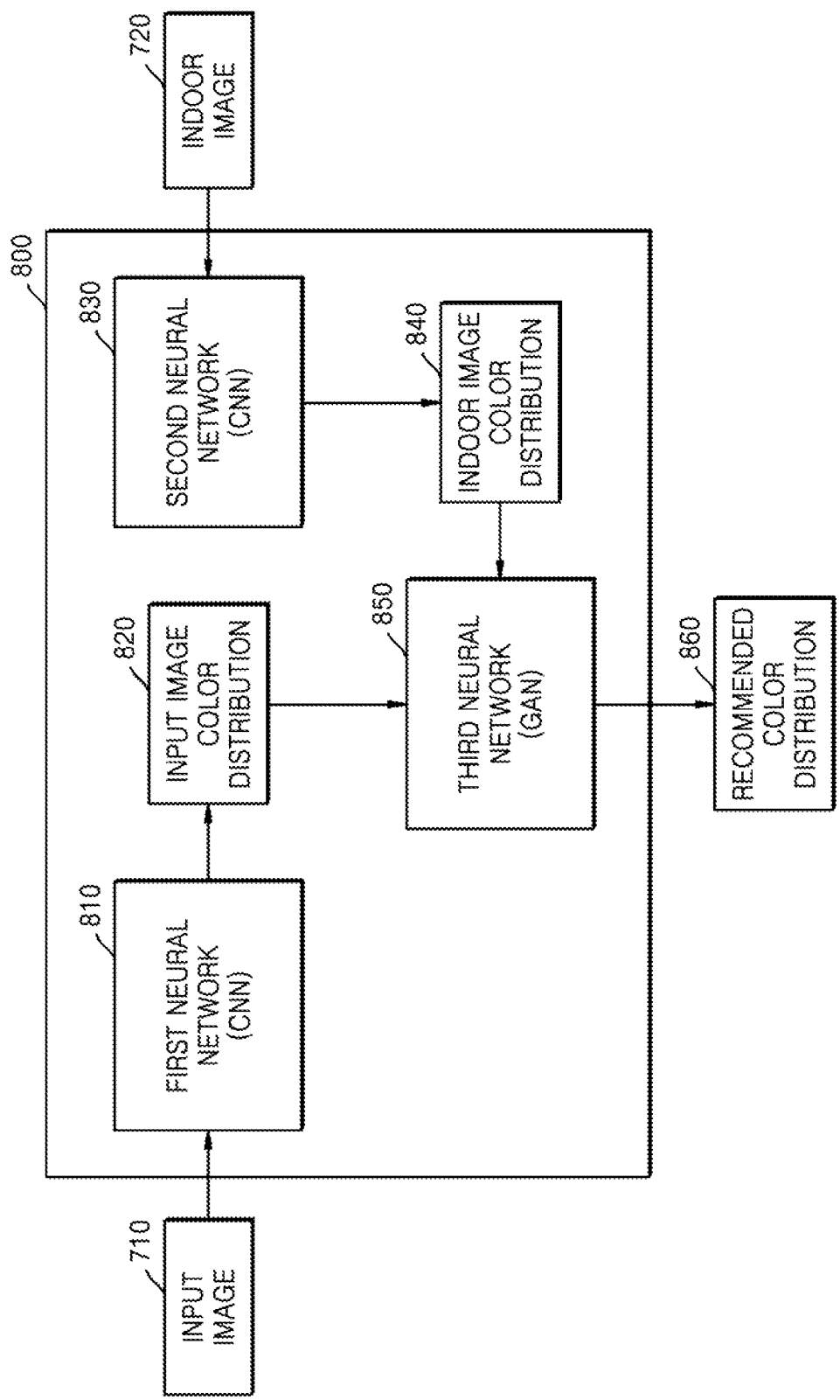
FIG. 8 is a reference diagram for describing an image analysis module obtaining a recommended color distribution based on an input image and an indoor image, according to an embodiment.

FIG. 8 is a reference diagram for describing an image analysis module 800 obtaining a recommended color distribution based on an input image and an indoor image according to an embodiment.

Referring to FIG. 8, the image analysis module 800 may include a first neural network 810, a second neural network 830, and a third neural network 850.

The first neural network 810 may receive the input image 710 and extract features from the input image 710 in units of pixels, and may output, based on the extracted features, an input image color distribution 820 including at least one color included in the input image 710 and a proportion of each color in the input image, that is a color probability. When the input image 710 is a color image, the first neural network 810 may obtain an input image color distribution by extracting features such as color, shape, and texture from the input image 710 which is a color image. When the input image 710 is a black and white image, also, the first neural network 810 may obtain an input image color distribution by extracting features except for the color, such as shape and texture from the input image 710 which is in black and white.

The second neural network 830 may receive the indoor image 720 and extract features from the indoor image 720 in units of pixels, and may output, based on the extracted features, an indoor image color distribution 840 including at least one color included in the indoor image 720 and a proportion of each color in the indoor image 720, that is a color probability.

The first neural network 810 and the second neural network 830 may include, for example, a convolutional neural network (CNN). Although the first neural network 810 and the second neural network 830 are shown as different modules in FIG. 8, the first neural network 810 and the second neural network 830 may be integrated into a single module.

The CNN, which is an example of a feature extraction model for extracting features from an image by using at least one neural network, may include a convolutional feature extraction portion and a classification portion. Features of an input image may be extracted through convolutional layers, and classification may be performed using an existing neural network based on the extracted features. For example, as features of an image, color, texture, shape, and the like may be included, and color features may include image color, a color histogram indicating the expression of a distribution of colors in the image, a color moment, a color coherence vector, or the like, and edge or the like may be included as texture features.

A convolutional layer has a function of extracting features from input data, and may include a filter that extracts features and an activation function that converts a value of the filter into a nonlinear value. A filter may be referred to as a function that detects whether or not features of an image to be extracted are present in target data. When a feature map is extracted using filters as described above, values are activated by applying an activation function to the feature map. Examples of activation functions include Sigmoid and Relu functions.

The extracted features are sub-sampled when necessary, and this sub-sampling is performed to reduce an amount of computation by reducing a size of an extracted feature map, which is also referred to as pooling.

A fully connected layer may classify values of features extracted from a convolution layer by applying the values of the extracted features to an existing neural network, and a Softmax function may be used, for example.

The third neural network 850 may receive the input image color distribution 820 and the indoor image color distribution 840 and obtain a recommended color distribution 860 by reflecting the indoor image color distribution 840 in the input image color distribution 820. In addition to using the color distribution included in the input image, the color distribution included in the indoor image may be further reflected by reflecting the indoor image color distribution 840 in the input image color distribution 820 by using the third neural network 850, thereby obtaining a recommended color distribution that is adaptive to the indoor environment of the user. The third neural network 850 may include, for example, a Generative Adversarial Network (GAN).

In the example shown in FIG. 8, a recommended color distribution based on an input image and an indoor image is shown as including information modified by reflecting a recommended color distribution based on an indoor image in a recommended color distribution based on an input image, but the disclosure is not limited thereto. As another example, a recommended color distribution based on an input image and an indoor image may include information modified by reflecting a recommended color distribution based on an input image in a recommended color distribution based on an indoor image.

Figure 9:
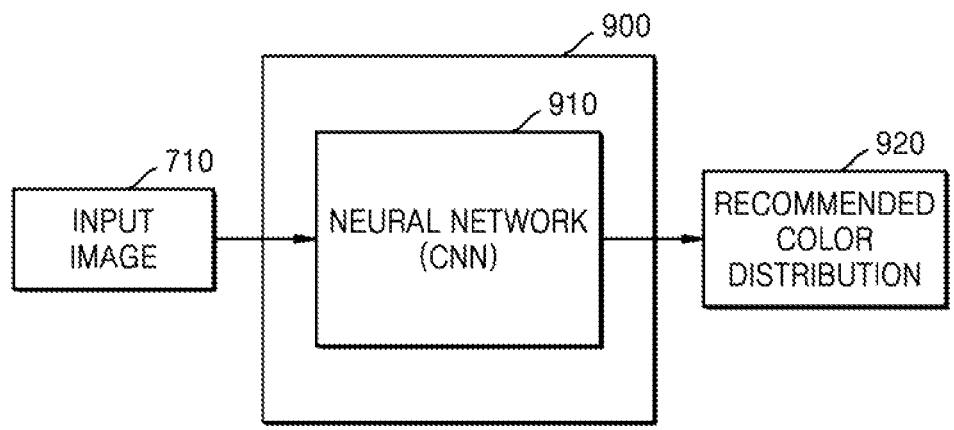
FIG. 9 is a reference diagram for describing an image analysis module obtaining a recommended color distribution based on an input image, according to an embodiment.

FIG. 9 is a reference diagram for describing an image analysis module 900 obtaining a recommended color distribution based on an input image, according to an embodiment.

Referring to FIG. 9, the image analysis module 900 may include a first neural network 910 that obtains a recommended color distribution based on an input image without input of an indoor image.

The first neural network 910 may receive an input image 710 and extract features from the input image 710 in units of pixels, and may output, based on the extracted features, a recommended color distribution 920 including at least one color included in the input image 710 and a proportion of each color in the input image, that is, a color probability. When the input image 710 is a color image, the first neural network 910 may obtain a recommended color distribution by extracting features such as color, shape, and texture from the input image 710 which is a color image. Also when the input image 710 is a black and white image, the first neural network 910 may obtain a recommended color distribution by extracting features except for the color, such as shape and texture from the input image 710 which is in black and white.

According to an embodiment, when an input image is a black and white image, the electronic apparatus 100 may infer, from the input image by using a neural network using AI, a recommended color distribution corresponding to the input image. As described above, also when an input image is a black and white image, a recommended color distribution suitable for a shape of an object included in the input image which is a black and white image may be obtained using AI.

Figure 10:
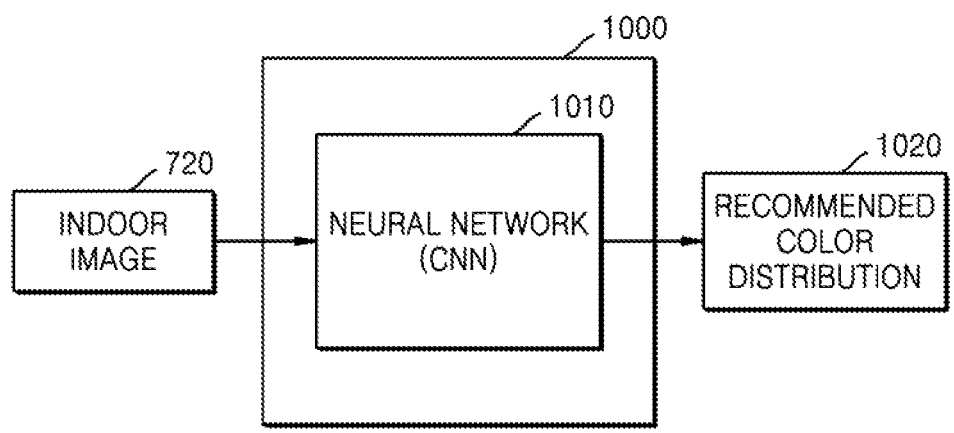
FIG. 10 is a reference diagram for describing an image analysis module obtaining a recommended color distribution based on an indoor image, according to an embodiment.

FIG. 10 is a reference diagram for describing an image analysis module 1000 obtaining a recommended color distribution based on an indoor image, according to an embodiment.

Referring to FIG. 10, the image analysis module 1000 may include a first neural network 1010 that obtains a recommended color distribution based on an indoor image without input of an input image.

The first neural network 1010 may receive an indoor image 720 and extract features from the indoor image 720 in units of pixels, and may output, based on the extracted features, a recommended color distribution 1020 including at least one color included in the indoor image 720 and a proportion of each color in the input image. When the indoor image 720 is a color image, the first neural network 1010 may obtain a recommended color distribution by extracting features such as color, shape, and texture from the indoor image 720 which is a color image. Also when the indoor image 720 is a black and white image, the first neural network 1010 may obtain a recommended color distribution by extracting features except for the color, such as shape and texture from the indoor image 720 which is in black and white.

According to an embodiment, when the electronic apparatus 100 obtains an indoor image, the electronic apparatus 100 may obtain a recommended color distribution based on the indoor image by analyzing the indoor image. For example, a recommended color distribution based on an indoor image may include information about at least one color included in the indoor image and information about a proportion of the at least one color in the indoor image. As described above, by capturing an indoor image and obtaining a color distribution from the indoor image, an indoor environment or an indoor mood at a point of time of using a magic hand function may be reflected in colors in the input image. Thus, a user may obtain a color that is adaptively suitable for a current situation or environment. For example, even in a same indoor environment, the mood of the overall colors of an indoor image captured in the morning may be different from that of an indoor image captured in the night, and thus, according to each point of time, a relatively bright and light recommended color distribution may be obtained in the morning or the day, and a relatively dark or heavy recommended color distribution may be obtained in the night.

As shown in FIG. 10, the image analysis module 1000 may obtain a recommended color distribution by using an indoor image and without an input image, and thus, when a user wishes to draw a picture on a blank screen or a blank image instead of selecting an input image, the electronic apparatus 100 may use the recommended color distribution obtained from the indoor image, in controlling of image processing.

According to an embodiment, the electronic apparatus 100 may modify or update a recommended color distribution obtained using an image analysis module according to a user input.

Figure 11:
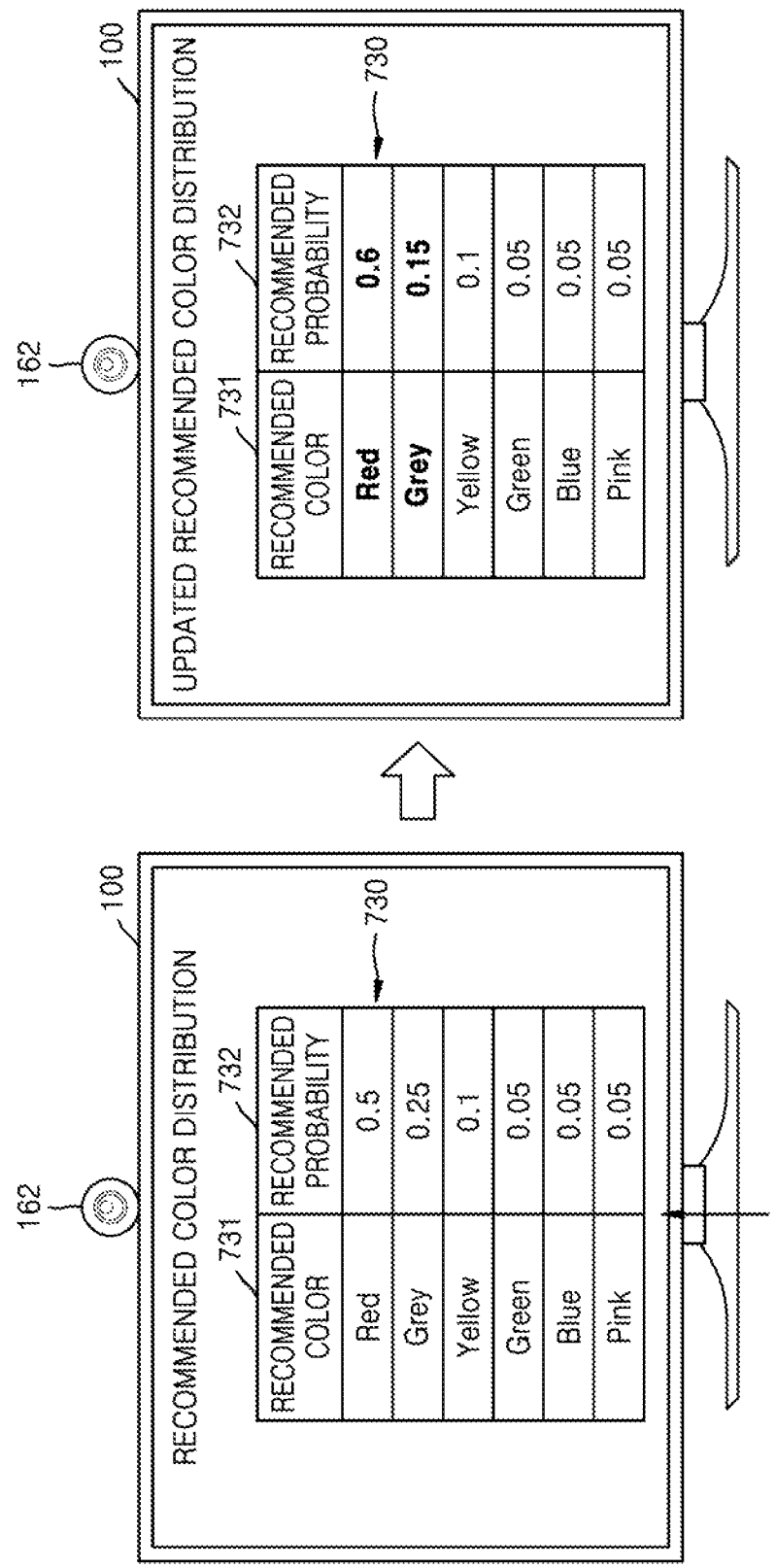
FIG. 11 is a reference diagram for describing a method of modifying a recommended color distribution obtained using an image analysis module, according to an embodiment.

FIG. 11 is a reference diagram for describing a method of modifying a recommended color distribution obtained using an image analysis module, according to an embodiment.

Referring to FIG. 11, the electronic apparatus 100 may display a recommended color distribution 730 obtained using an image analysis module on a display to show the same to a user.

The user may check the recommended color distribution 730 displayed on the display and may wish to modify a recommended color or recommendation probability included in the recommended color distribution 730. Thus, upon receiving an input from a user, the electronic apparatus 100 may modify a recommended color or recommendation probability included in the recommended color distribution 730. For example, the user may modify at least one color included in the recommended color or remove at least one color or add a new color. Also, the user may modify a recommendation probability. For example, when receiving an input of modifying a recommendation probability of a color corresponding to Red from 0.5 to 0.6 and a recommendation probability of a color corresponding to Grey from 0.25 to 0.15, the electronic apparatus 100 may modify a recommendation probability corresponding to Red from 0.5 to 0.6 and a recommendation probability of a color corresponding to Grey from 0.25 to 0.15, according to the input from the user. For example, when receiving from a user an input of modifying a color corresponding to red to pink, the electronic apparatus 100 may modify red of the recommended color to pink according to the input from the user.

Referring back to FIG. 5, in operation 530, the electronic apparatus 100 may obtain an image of the user's hand 20, and may generate a magic hand by mapping at least one color to the hand image of the user by using the recommended color distribution.

FIG. 12 is a reference diagram for describing a magic hand generation module generating a magic hand by using a hand image of a user and a recommended color distribution, according to an embodiment.

Referring to FIG. 12, a magic hand generation module 1200 may include a suitable logic, circuit, interface, and/or code operable to generate a magic hand by mapping at least one color included in a recommended color distribution to a hand image of a user by using the hand image of the user and the recommended color distribution.

According to an embodiment, the electronic apparatus 100 may obtain a hand image of the user by using the camera 162. The electronic apparatus 100 may also use a hand image of the user previously stored in a storage.

The magic hand generation module 1200 may generate a magic hand 1210 by performing color mapping by using at least one color included in the recommended color distribution 730 in the hand image of the user. The magic hand 1210 may consist of regional coordinates 1211 of the hand image of the user and a color 1212 corresponding to the regional coordinates 1211. The electronic apparatus 100 may identify the hand image of the user as at least one region and may map a color included in the recommended color distribution to each of identified regions. Methods of identifying a hand image of the user as at least one region may be determined in various manners; for example, according to a size of a recommendation probability of a color included in the recommended color distribution, a size of a region of the hand image of the user corresponding to the color may be determined. For example, as shown in FIG. 12, when a recommendation probability of the red color in the recommended color distribution 730 is 0.5, the magic hand generation module 1200 may map the red color to a region corresponding to 50 percent of the hand image of the user; when a recommendation probability off the grey color corresponds to 0.25, the magic hand generation module 1200 may map the grey color to a region corresponding to 25 percent of the hand image of the user. For example, a color of a highest recommendation probability may be mapped to a palm area of the hand image, and a color may be mapped to at least one finger area based on a next highest recommendation probability. By setting the total area of the hand image of the user as 100 percent, the magic hand 1210 may be generated by mapping a color to an area of the hand image in proportion to a recommendation probability of each color included in each recommended color distribution. By arranging colors mapped to a magic hand based on ratios of colors included in a recommended color distribution as described above, a user may use colors in which colors of an input image or an indoor image are intuitively reflected, in controlling of image processing.

According to an embodiment, the electronic apparatus 100 may display the magic hand on a portion of the display of the electronic apparatus 100 as a magic hand preview image.

Figure 13:
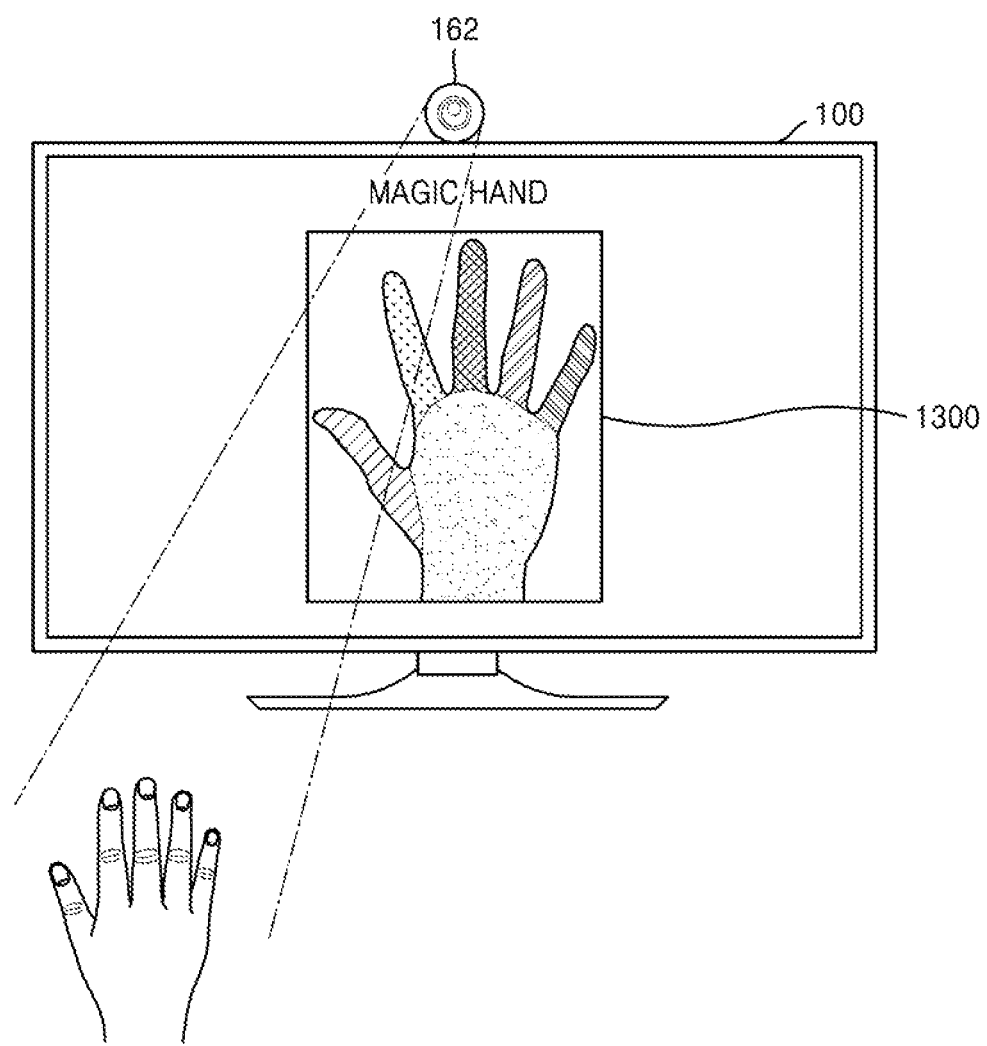
FIG. 13 is a reference diagram for describing an example of displaying, by an electronic apparatus, a magic hand preview image, according to an embodiment.

FIG. 13 is a reference diagram for describing an example of displaying, by the electronic apparatus 100, a magic hand preview image, according to an embodiment.

Referring to FIG. 13, the display of the electronic apparatus 100 may display a magic hand preview image 1300. A user may check the magic hand preview image 1300 displayed on the display and recognize a color combination mapped to a magic hand.

According to an embodiment, the camera 162 of the electronic apparatus 100 may map a hand image obtained by capturing an image of a hand of a user to a magic hand preview image, thereby displaying movement of the magic hand preview image according to movement of the hand of the user.

According to an embodiment, the electronic apparatus 100 may control such that a color mapped to a magic hand generated using a recommended color distribution is modified via a user input.

Figure 14:
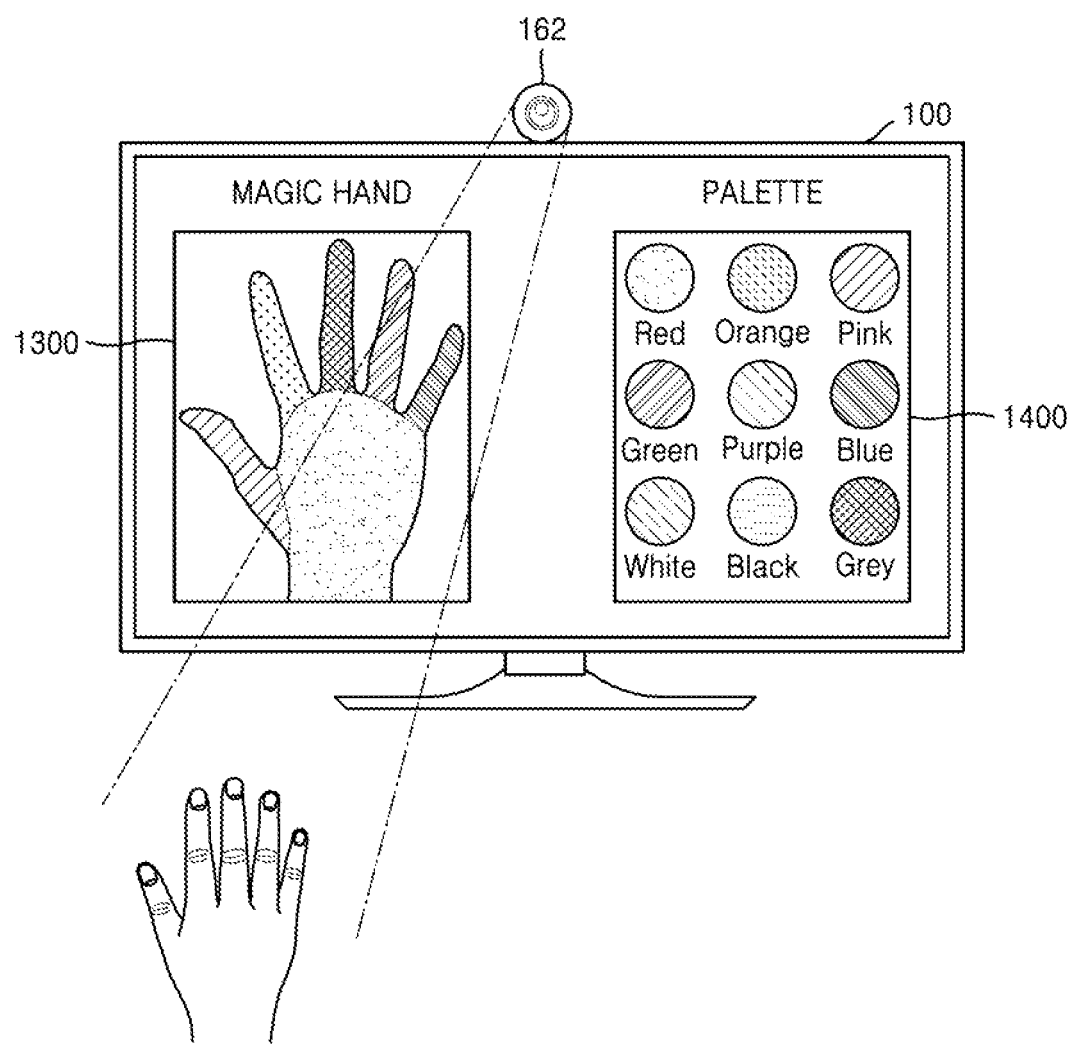
FIG. 14 is a reference diagram for describing an example of modifying, by an electronic apparatus, a color mapped to a magic hand, according to an embodiment.

FIG. 14 is a reference diagram for describing an example of modifying, by the electronic apparatus 100, a color mapped to a magic hand, according to an embodiment.

Referring to FIG. 14, the display of the electronic apparatus 100 may display the magic hand preview image 1300 and a palette 1400. A user may check the magic hand preview image 1300 displayed on the display of the electronic apparatus 100 and select at least one color included in the palette 1400 to modify a color mapped to the magic hand preview image 1300 to the selected color. Thus, even when a magic hand preview image already includes colors based on an input image or an indoor image, the user may modify at least one color mapped to the magic hand after identifying a completed magic hand preview image.

When modifying at least one color mapped to the magic hand, manipulation may be performed via various interfaces. For example, the electronic apparatus 100 may receive a voice command of a user via the microphone 161 and modify a color based on the received voice command. For example, the electronic apparatus 100 may receive a voice command such as "change the red color of the magic hand to pink" via the microphone 161 and perform voice recognition processing of the voice command, thereby performing an operation corresponding to the voice command. For example, the electronic apparatus 100 may obtain a command corresponding to a modification of a color of a magic hand via the user input interface 190 or a control signal by using a remote controller by using the optical receiver 163 or the communicator 150.

According to an embodiment, the electronic apparatus 100 may map a color mapped to a magic hand, to a hand image by using a color selected according to a user input, without using a recommended color distribution. For example, from the display illustrated in FIG. 14, instead of the magic hand preview image 1300, the electronic apparatus 100 may output a hand image of the user, to which no color is mapped, and may map at least one color selected from the palette 1400 to the magic hand according to a user's selection to thereby complete a magic hand.

According to an embodiment, the electronic apparatus 100 may generate at least one magic hand and display at least one magic hand on the display.

Figure 15:
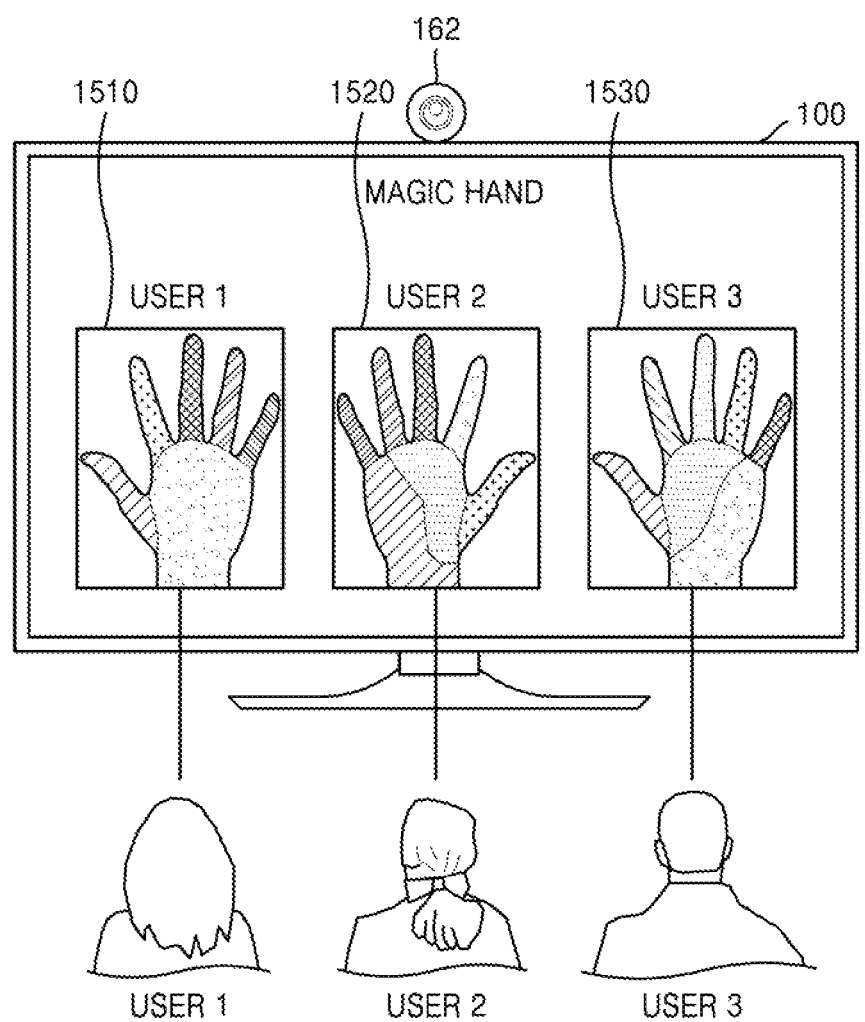
FIG. 15 is a reference diagram for describing an example of managing, by an electronic apparatus, at least one magic hand, according to an embodiment.

FIG. 15 is a reference diagram for describing an example of managing, by the electronic apparatus 100, at least one magic hand, according to an embodiment.

Referring to FIG. 15, the electronic apparatus 100 may output at least one magic hand preview, for example, a magic hand preview 1510 corresponding to user 1, a magic hand preview 1520 corresponding to user 2, and a magic hand preview 1530 corresponding to user 3. Magic hands respectively corresponding to multiple users, for example, a magic hand of a father, a magic hand of a mother, a magic hand of a child among family members may be generated. To identify multiple users, each user may be identified by using the camera 162 included in the electronic apparatus 100, and magic hands respectively corresponding to different users may be generated.

For example, at least one magic hand may include a magic hand corresponding to the left hand of a user and a magic hand corresponding to the right hand of the user.

According to an embodiment, the electronic apparatus 100 may store a generated magic hand in a storage and read and use the magic hand stored in the storage according to selection by a user. For example, a user may store a magic hand that is generated at a certain point of time, in a storage of the electronic apparatus 100 to use the magic hand later. For example, when using a magic hand function, the user may read previously stored magic hands from the storage to use the magic hands.

In operation 540 of FIG. 5, the electronic apparatus 100 may display the input image 10 on a display.

Figure 16:
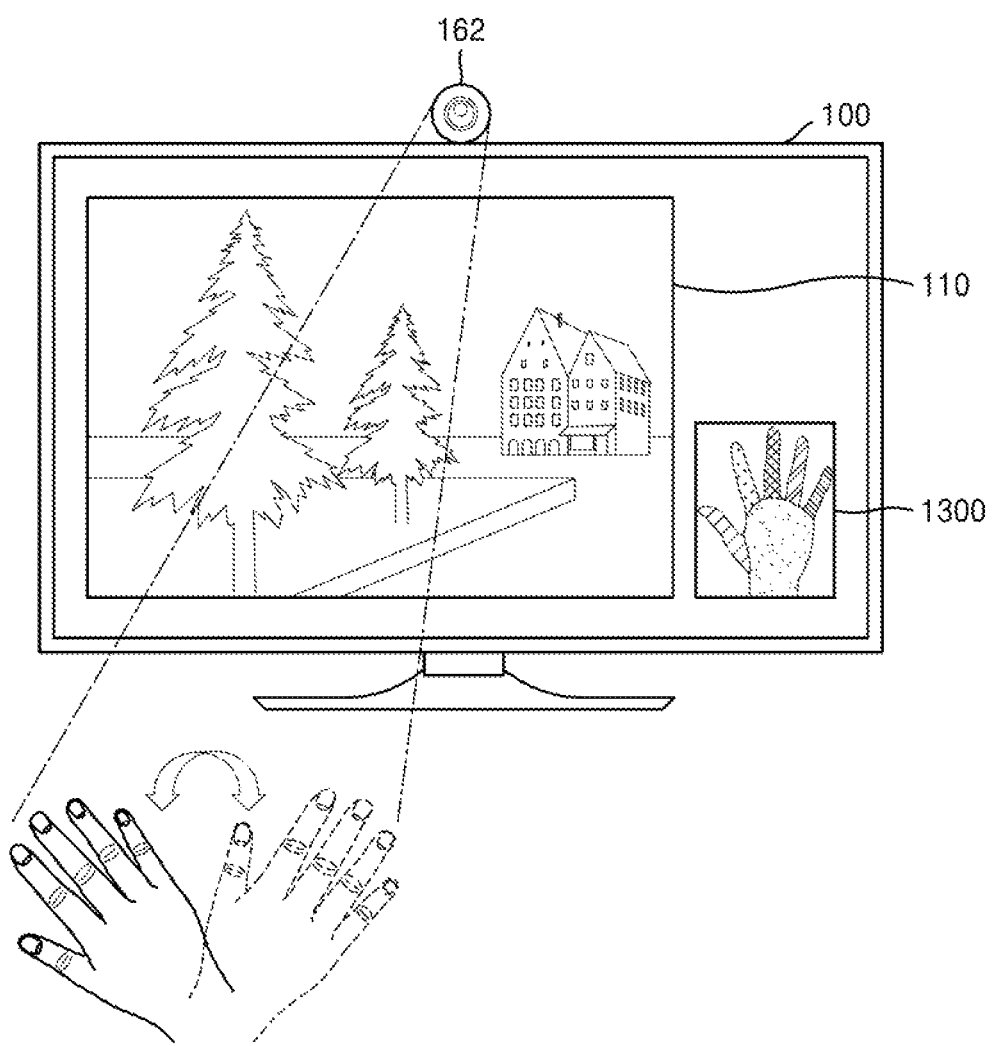
FIG. 16 illustrates an example in which an electronic apparatus displays an input image, according to an embodiment.

FIG. 16 shows an example in which the electronic apparatus 100 displays an input image 110, according to an embodiment.

Referring to FIG. 16, an example in which the electronic apparatus 100 displays the input image 110 and a magic hand preview image 1300 is shown.

According to an embodiment, when an input image is a black and white image, the electronic apparatus 100 may display the input image which is a black and white image, on a display without any change.

According to an embodiment, when an input image is a color image, the electronic apparatus 100 may convert the input image which is a color image, into a black and white image and display the black and white image on a display. By converting an input image that is a color image into a black and white image and displaying the black and white image, a user may perform color control with desired colors by using a magic hand on the black and white image displayed on the display.

According to an embodiment, when there is no input image, the electronic apparatus 100 may display a blank image on the display. In this case, the user may draw a picture on a blank screen by using the electronic apparatus 100 like drawing a picture on a piece of white drawing paper. As described above, the user may perform not only control of processing of simply coloring an input image but may also perform processing such as drawing a picture by using a magic hand.

In operation 550 of FIG. 5, the electronic apparatus 100 may obtain a gesture of the user's hand 20 by using a camera, and control processing of the input image 10 displayed on the display based on the obtained hand gesture and a magic hand.

According to an embodiment, the electronic apparatus 100 may detect a gesture of the user's hand 20 by capturing an image of the user's hand 20 by using a camera and control a magic hand according to the detected hand gesture. As at least one color is mapped to the magic hand, a user needs to be able to control the at least one color included in the magic hand in order to perform control of image processing with colors desired by the user on the magic hand. For example, when the user wishes to perform image processing control by using a red color from among various colors included in the magic hand, a gesture for identifying that the red color is selected for image processing control needs to be detected. For example, when determining to perform image processing control by using a color mapped to an index finger of the hand of the user, a certain color needs to be appointed to correspond to the index finger of the hand of the user by using a gesture of the user.

According to an embodiment, the electronic apparatus 100 may select a color to be used in controlling of colors of an input image from among at least one color mapped to a magic hand, according to a detected hand gesture.

Figure 17A:
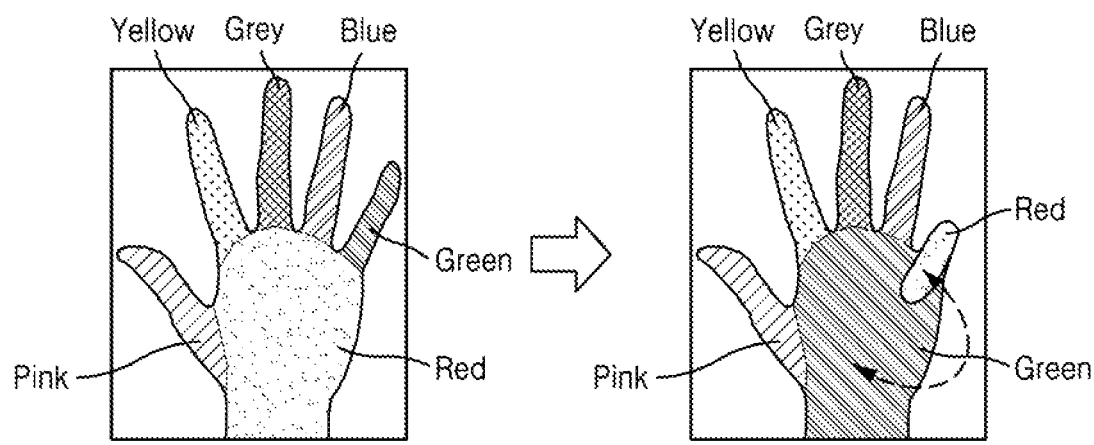
FIGS. 17A and 17B are reference diagrams for describing an example in which an electronic apparatus selects a color to be used in color control of an input image from among at least one color mapped to a magic hand, according to a detected hand gesture, according to an embodiment.
Figure 17B:
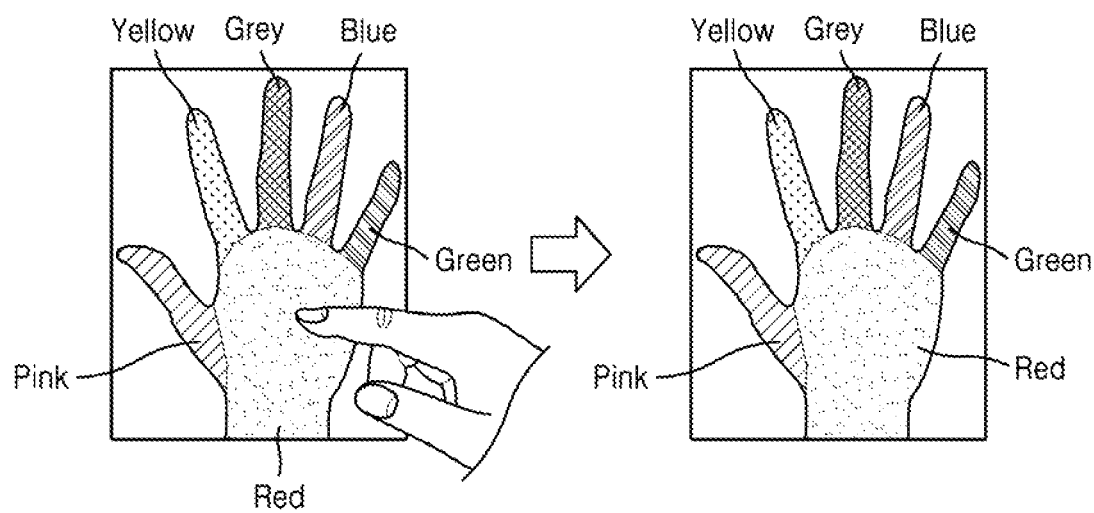

FIGS. 17A and 17B are reference diagrams for describing an example in which an electronic apparatus 100 selects a color to be used in color control of an input image from among at least one color mapped to a magic hand, according to a detected hand gesture, according to an embodiment.

Referring to FIG. 17A, colors to be exchanged with each other may be modified by touching fingers or palms corresponding to the colors. Referring to FIG. 17A, pink, yellow, grey, green, and blue are respectively mapped to the fingers of a magic hand in order, and Red is mapped to the palm. Users may exchange colors by touching each other's fingers or palms, colors of which are to be exchanged. For example, referring to FIG. 17A, green is mapped to the little finger of the magic hand, and red is mapped to the palm. Here, a color used in control of image processing is set as a color mapped to the little finger of the magic hand, and by using the magic hand, image processing control may be performed by using green mapped to the little finger. When the user wishes to modify the color used for image processing control to red, the user may make a modification such that the red color is mapped to the little finger to exchange green, the color mapped to the little finger, and red, the color mapped to the palm by touching the tip of the little finger on the palm of the hand. The color of which finger is to be used in image processing control may be determined in various manners. For example, the color of the index finger may be used in image processing control.

Referring to FIG. 17B, processing of selecting a color used in image processing control, according to a gesture of touching the finger or the palm of a hand corresponding to a magic hand, with the finger of another hand, instead of the hand corresponding to the magic hand may be performed. For example, when the user wishes to perform image processing control using red, the electronic apparatus 100 may use the red color corresponding to the region of the magic hand indicated by the finger of another hand, that is, the palm region, in image processing control according to a gesture of the user indicating the region of the magic hand corresponding to the red color, with the finger of another hand.

According to an embodiment, the electronic apparatus 100 may modify a color to be used in controlling of colors of an input image from among at least one color mapped to a magic hand, according to various hand gestures.

According to an embodiment, the electronic apparatus 100 may modify properties of a color mapped to a magic hand according to various hand gestures. For example, the properties of a color may include brightness or chroma of the color.

Figure 18A:
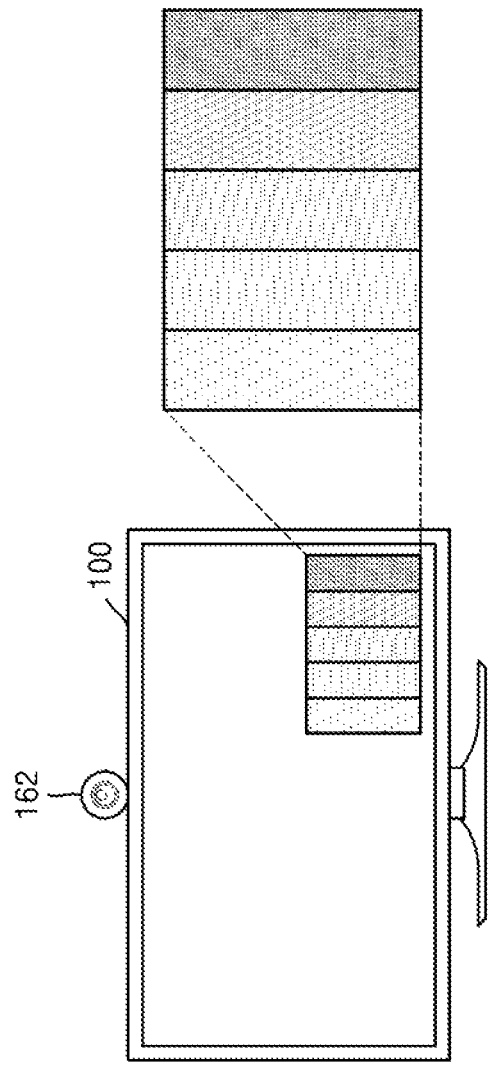
FIGS. 18A and 18B show examples of modifying, by an electronic apparatus, properties of a color mapped to a magic hand according to various hand gestures, according to an embodiment.
Figure 18B:
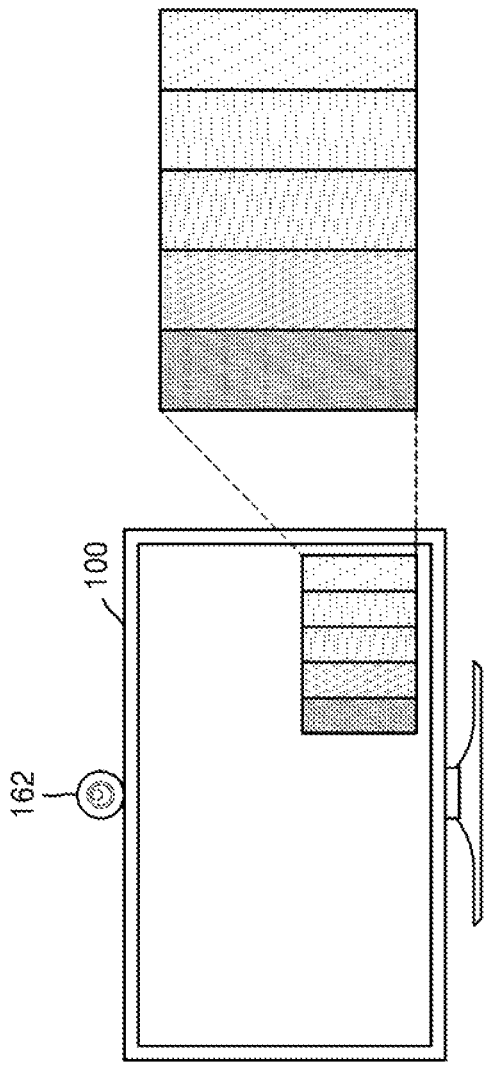

FIGS. 18A and 18B show examples of modifying, by the electronic apparatus 100, properties of a color mapped to a magic hand according to various hand gestures, according to an embodiment.

Referring to FIG. 18A, for example, a modification may be made to increase brightness of a color included in a magic hand according to a gesture of raising the index finger with the user's three fingers folded. Referring to FIG. 18B, for example, a modification may be made to lower brightness included of a color included in a magic hand according to a gesture of bending the index finger downward with the user's three fingers folded. For example, as a period of time for maintaining the gesture with the index finger upward or downward increases, the brightness of the color may be increased or reduced gradually.

According to an embodiment, the electronic apparatus 100 may control color processing of an input image displayed on a display of the electronic apparatus 100 according to a detected hand gesture. For example, the electronic apparatus 100 may select a red color from among at least one color mapped to a magic hand as a color to be used in controlling of colors of an input image, according to a detected hand gesture, and control color processing of the input image by using the red color according to the detected hand gesture. For example, when an input image is a blank image, that is, when there is no input image, the electronic apparatus 100 may control image processing such that a picture is drawn on a blank screen by using a selected color according to a detected hand gesture.

According to an embodiment, the electronic apparatus 100 may control a color mapped to a magic hand corresponding to hands of multiple users according to a gesture interacting with the hands of the multiple users.

Figure 19:
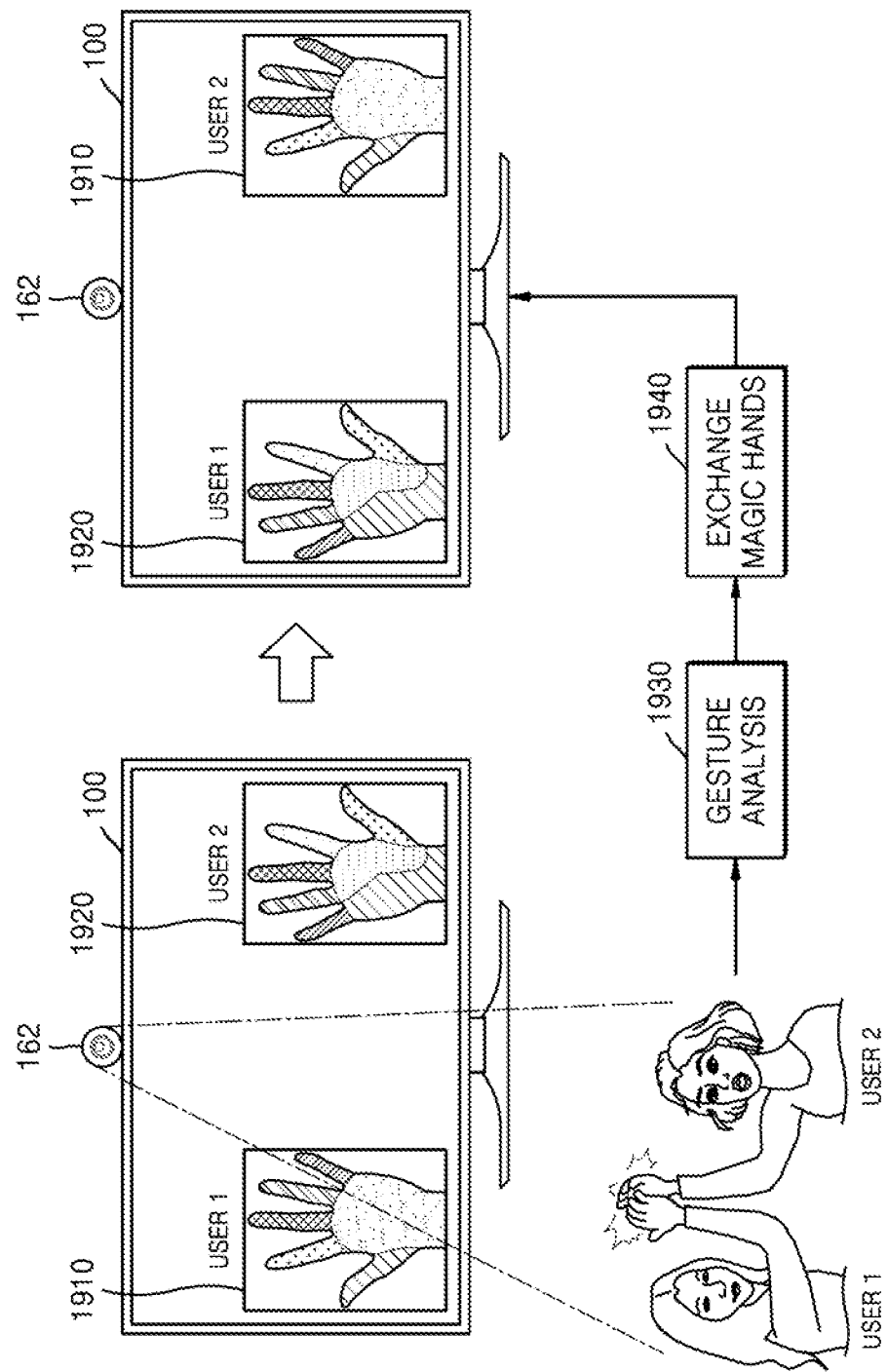
FIG. 19 is a reference diagram for describing an example of controlling, by an electronic apparatus, a color mapped to a magic hand corresponding to hands of multiple users according to a gesture interacting with the hands of the multiple users, according to an embodiment.

FIG. 19 is a reference diagram for describing an example of controlling, by the electronic apparatus 100, a color mapped to a magic hand corresponding to hands of multiple users according to a gesture interacting with the hands of the multiple users, according to an embodiment.

Referring to FIG. 19, a display of the electronic apparatus 100 may display a magic hand 1910 corresponding to user 1 and a magic hand 1920 corresponding to user 2. However, user 1 and user 2 may take a gesture of interacting with each other in order to exchange their magic hands with each other.

When the electronic apparatus 100 detects a gesture in which user 1 and user 2 interact with each other, and the above gesture is recognized as an interacting gesture between user 1 and user 2 according to the detection (1930), the electronic apparatus 100 may exchange the magic hands of user 1 and user 2 with each other (1940). Accordingly, the electronic apparatus 100 may display the magic hand 1920 as a magic hand of user 1 and the magic hand 1910 as a magic hand of user 2.

An interacting gesture may include gestures that allow body parts related to hands of a user such as finger, the back of one's hand, palm, or elbow of multiple users to interact with each other. For example, the electronic apparatus 100 may perform control of allowing, through a high-five of the hands of the two users, colors of two magic hands respectively corresponding to the hands of two users to be exchanged with each other or the colors of the two magic hands to be mixed with each other.

According to an embodiment, the electronic apparatus 100 may generate a plurality of magic hands respectively corresponding to hands of multiple users and control processing of an input image displayed on a display through cooperation of the multiple users based on hand gestures of the multiple users and magic hands corresponding to the hands of the users. For example, the electronic apparatus 100 may generate a magic hand 1910 corresponding to a mother and a magic hand 1920 corresponding to a child, and control processing of an input image based on a hand gesture of the mother and the magic hand 1910 of the mother and a hand gesture of the child and the magic hand 1920 of the child. Accordingly, the mother and the child may cooperate and color an input image displayed on the display of the electronic apparatus 100.

According to an embodiment, the electronic apparatus 100 may control processing of an input image based on magic hands and hand gestures of users who are remote from each other, via screen sharing. For example, electronic apparatuses that are remote from each other may be connected to one another via a communication network and share an input image via screen sharing and display the input image on each display. Also, an input image processing control result obtained based on a hand gesture and a magic hand of a user of the first electronic apparatus may be transmitted to a second electronic apparatus in real time, and an input image processing control result obtained based on a hand gesture and a magic hand of a user of the second electronic apparatus may be transmitted from the second electronic apparatus to the first electronic apparatus in real time, and accordingly, a user experience that resembles controlling processing of an input image through cooperation between user 1 and user 2 may be obtained.

Figure 20:
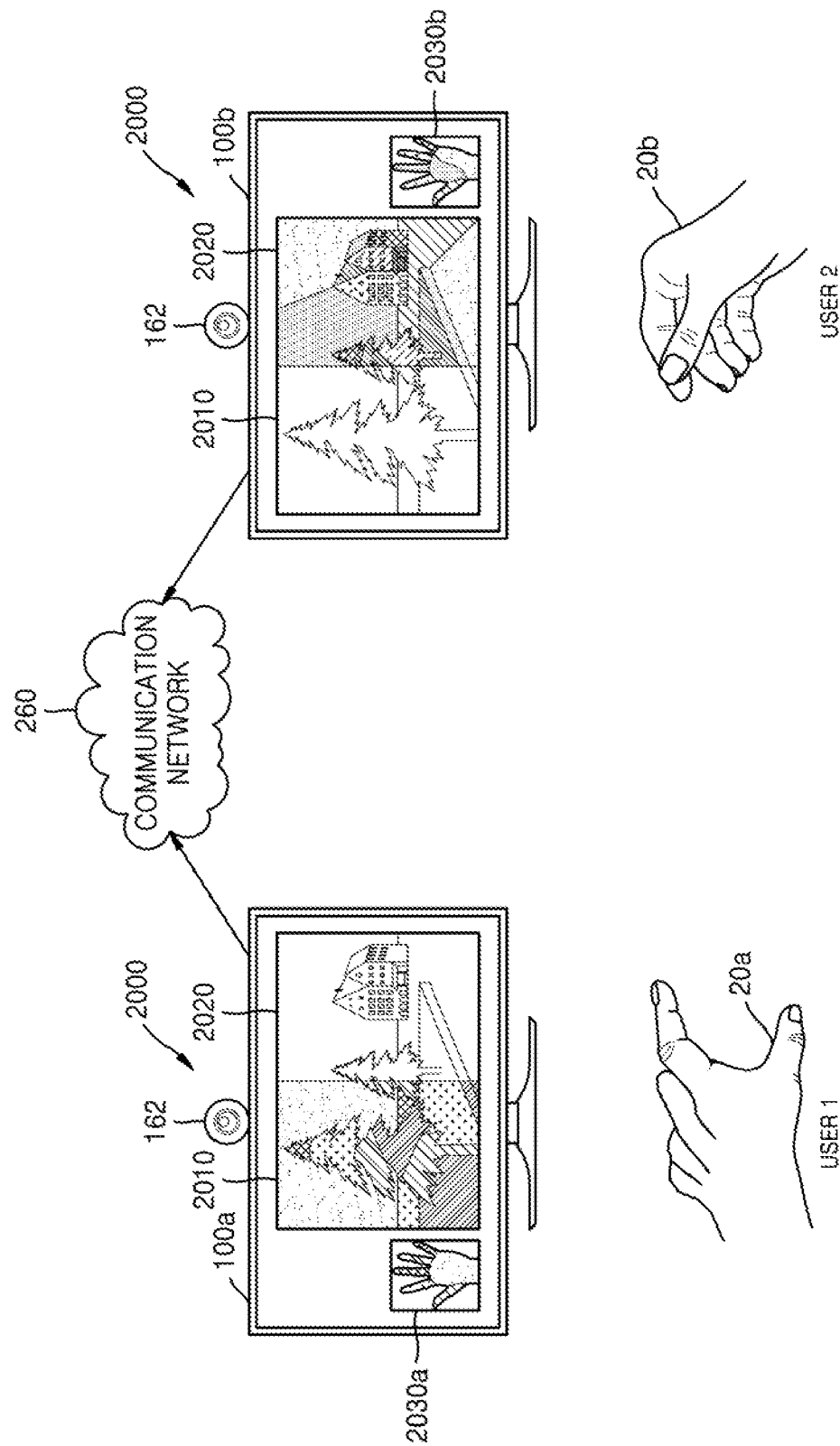
FIG. 20 is a reference diagram for describing an example of controlling, by an electronic apparatus, input image processing based on magic hands and hand gestures of users who are remote from each other, via screen sharing, according to an embodiment.

FIG. 20 is a reference diagram for describing an example of controlling, by the electronic apparatus 100, input image processing based on magic hands and hand gestures of users who are remote from each other, via screen sharing, according to an embodiment.

Referring to FIG. 20, the first electronic apparatus 100a and the second electronic apparatus 100b are connected to each other via communication through the communication network 260, and the first electronic apparatus 100a and the second electronic apparatus 100b may share a same, input image 2000 and display the same via screen sharing technology.

The first electronic apparatus 100a may obtain a recommended color distribution by obtaining the input image 2000 and an image of an indoor environment in which the first electronic apparatus 100a is placed and analyzing the input image 2000 and the indoor image, and generate a magic hand corresponding to user 1 by obtaining a hand image 20a of user 1 and mapping the recommended color distribution to the hand image 20a. The first electronic apparatus 100a may display a preview image 2030a of the generated magic hand.

The second electronic apparatus 100b may obtain a recommended color distribution by obtaining the input image 2000 and an image of an indoor environment in which the second electronic apparatus 100b is placed and analyzing the input image 2000 and the indoor image, and generate a magic hand corresponding to user 2 by obtaining a hand image 20b of user 2 and mapping the recommended color distribution to the hand image 20b. The second electronic apparatus 100b may display a preview image 2030b of the generated magic hand.

While having the input image 2000 shared via screen sharing as described above, the first electronic apparatus 100a and the second electronic apparatus 100b may perform input image processing control on the input image 2000 that is remotely shared, by cooperating with each other.

For example, the first electronic apparatus 100a may control image processing of at least a partial region 2010 of the input image 2000 by using the magic hand of user 1 and a hand image gesture of user 1. Also, the first electronic apparatus 100a may transmit an image processing control result, that is, data of the partial region 2010 that is color processed, to the second electronic apparatus 100b in real time via the communication network 260. Then the second electronic apparatus 100b may display the image processing control result received from the first electronic apparatus 100a on the partial region 2010 of the displayed input image 2000. The second electronic apparatus 100b may also control image processing of at least a partial region 2020 of the input image 2000 by using the magic hand of user 2 and a hand image gesture of user 2. Also, the second electronic apparatus 100b may transmit an image processing control result, that is, data of the partial region 2020 that is color processed, to the first electronic apparatus 100a in real time via the communication network 260. Then the first electronic apparatus 100a may display the image processing control result received from the second electronic apparatus 100b on the partial region 2020 of the displayed input image 2000. As described above, as two electronic apparatuses that are remote from each other transmit an image processing control result performed in each apparatus to each other in real time, each electronic apparatus may simultaneously display a result of image processing control of the input image 2000 performed through cooperation of two users, that is, user 1 and user 2. Thus, an effect resembling an image processing control of the input image 2000 that is jointly performed by user 1 and user 2 may be provided.

While input image processing control based on a magic hand, performed by two electronic apparatuses by using screen sharing is described in the example of FIG. 20, the above-described input image processing control is not only operable by two electronic apparatuses, and as long as screen sharing is possible, the input image processing control may also be implemented using three or more, that is, a plurality of electronic apparatuses.

In the example shown in FIG. 20, the input image 2000 is divided into set regions, that is, the partial region 2010 and the remaining partial region 2020, and image processing of each region is controlled using each electronic apparatus. However, how to divide the input image 2000 may also be determined in various manners. For example, the input image 2000 may not be divided into set regions, but user 1 may solely control the input image 2000, and user 2 may solely control the input image 2000, and users 1 and 2 may share each other's image processing control results.

According to an embodiment, the electronic apparatus 100 may use a magic hand function without an input image, thus providing an effect resembling drawing a picture on a blank image. By performing image processing control by using a magic hand function without an input image as described above, the electronic apparatus 100 may provide a user with a function that generates an effect of generating a new image.

Figure 21:
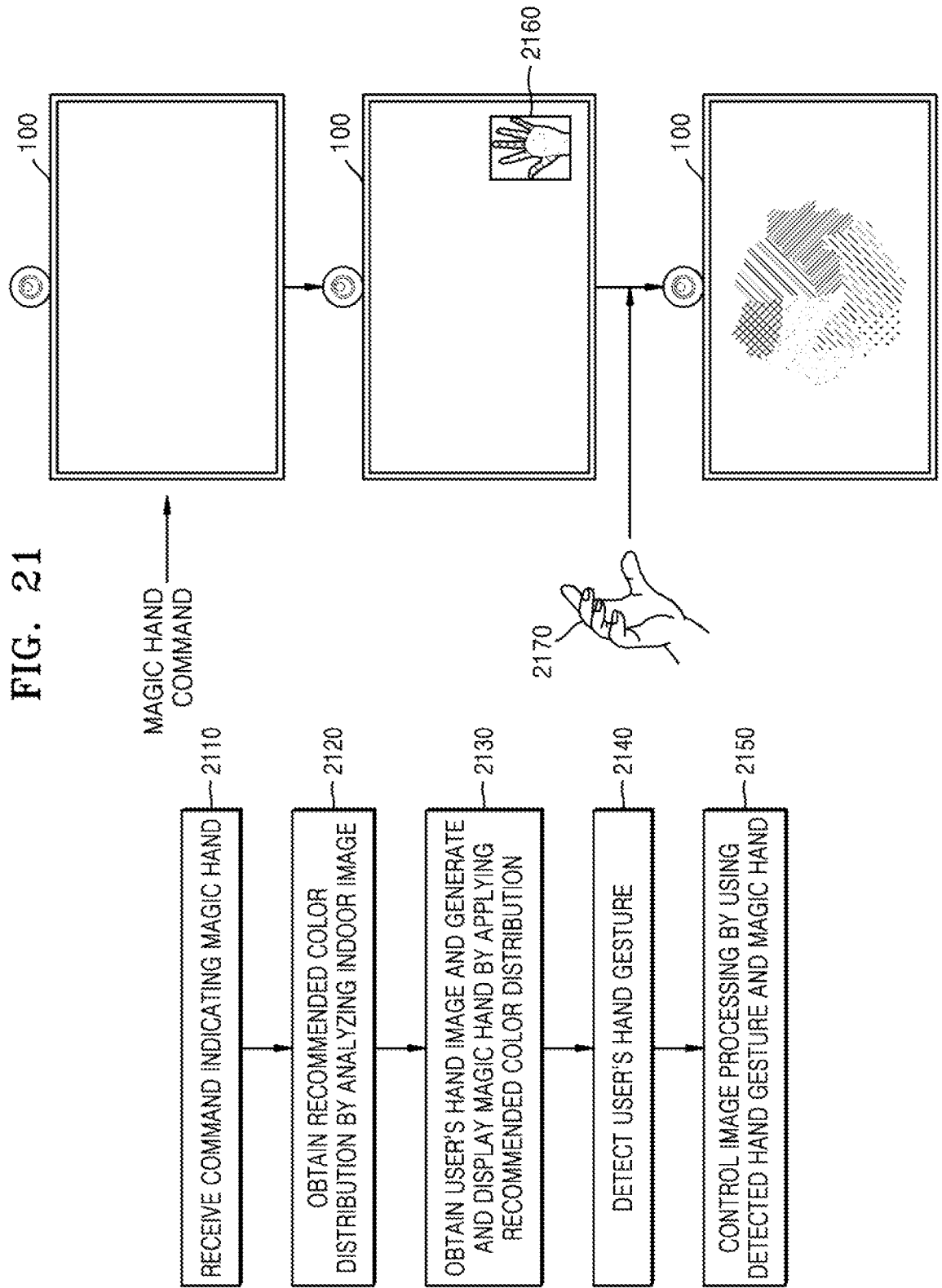
FIG. 21 is a reference diagram for describing an example of controlling, by an electronic apparatus, image processing by using a magic hand function without an input image, according to an embodiment.

FIG. 21 is a reference diagram for describing an example of controlling, by the electronic apparatus 100, image processing by using a magic hand function without an input image, according to an embodiment.

Referring to FIG. 21, in operation 2110, the electronic apparatus 100 may receive a command representing a magic hand. The electronic apparatus 100 may receive a command indicating a magic hand function via various user interfaces. For example, the command indicating a magic hand function may include a voice command received using a microphone, a gesture command received using a camera, a command received using a user input interface, a control command received from a remote controller by using an optical receiver, and a control command received from a smartphone by using a communicator, or the like.

In operation 2120, the electronic apparatus 100 may obtain a recommended color distribution by analyzing an indoor image. The electronic apparatus 100 may receive a command indicating a magic hand function, and when recognizing the received command, the electronic apparatus 100 may obtain an indoor image by using a camera, and obtain a recommended color distribution by analyzing the obtained indoor image. In this case, as the user does not use an additional input image, the recommended color distribution may be obtained only by analyzing the indoor image.

In operation 2130, the electronic apparatus 100 may obtain a user's hand image and generate and display a magic hand by applying a recommended color distribution to the obtained hand image. As no input image is used, the electronic apparatus 100 may display only a magic hand preview image 2160 without displaying an input image on the display.

In operation 2140, the electronic apparatus 100 may detect a user's hand gesture 2170.

For example, the electronic apparatus 100 may detect a hand gesture of a user by using a camera and analyze the detected hand gesture to thereby recognize an operation corresponding to the hand gesture.

In operation 2150, the electronic apparatus 100 may control image processing by using the detected hand gesture and the magic hand.

The electronic apparatus 100 may control image processing based on an operation of the recognized user's hand gesture and the magic hand. Here, the image processing control may include processing control such as drawing a picture on a blank image according to the user's hand gesture.

According to an embodiment, the electronic apparatus 100 may receive from a user a voice command to indicate an input image processing function by using a magic hand, and perform the input image processing function by using a magic hand by recognizing the received voice command. For example, a user may input a voice command such as "show me a tree image" or "magic hand" to the electronic apparatus 100 to use a magic hand function. By accepting an instruction related to a magic hand as a voice command, a user may use a magic hand function conveniently. In particular, young users who use the magic hand function may approach the magic hand function conveniently.

Figure 22:
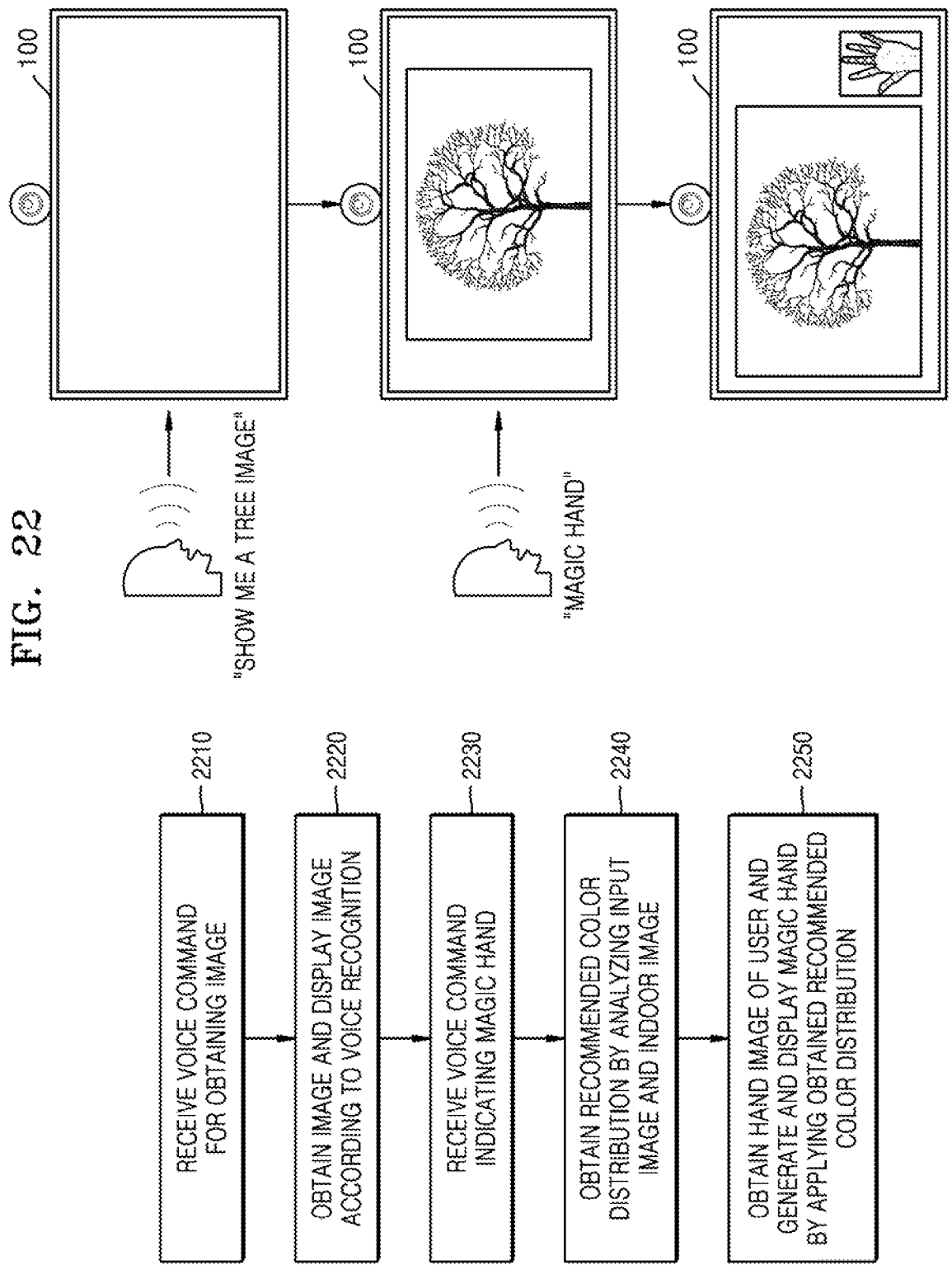
FIG. 22 is a reference diagram for describing an example of performing, by an electronic apparatus by using a voice command, a function of controlling image processing of an input image by using a magic hand, according to an embodiment.

FIG. 22 is a reference diagram for describing an example of performing, by the electronic apparatus 100 by using a voice command, a function of controlling image processing of an input image by using a magic hand, according to an embodiment.

Referring to FIG. 22, in operation 2210, the electronic apparatus 100 may receive a voice command for obtaining an image. For example, the electronic apparatus 100 may receive, from a user via a microphone, a voice command instructing to obtain an image, for example, "show me a tree image" or "download a tree image."

In operation 2220, the electronic apparatus 100 may obtain an image and display the image according to voice recognition.

For example, the electronic apparatus 100 may recognize a voice command received from a user by using a voice recognition function. The voice recognition function may be performed by using a voice recognition function module provided in the electronic apparatus 100 or a voice recognition function module of a server computer connected to the electronic apparatus 100 via communication. Voice recognition may be performed by converting an uttered voice into a text and analyzing the text. The electronic apparatus 100 may search for an image including a tree image in an internal storage of the electronic apparatus 100 based on the details of the voice command recognized through voice recognition or access a server computer connected via communication to request and obtain from the server computer an image including a tree image, and may display the obtained image on the display.

In operation 2230, the electronic apparatus 100 may receive a voice command indicating a magic hand.

A command indicating a magic hand function disclosed in the disclosure may be named by various names. For example, the electronic apparatus 100 may receive from a user by using a microphone a voice command of "magic hand" to indicate a magic hand function.

In operation 2240, the electronic apparatus 100 may obtain an indoor image, and may obtain a recommended color distribution by analyzing the indoor image and an input image.

By receiving a voice command indicating a magic hand, the electronic apparatus 100 may recognize the voice command through voice recognition and analyze the voice command to determine a start of a magic hand function, and accordingly, the electronic apparatus 100 may obtain an indoor image by using a camera and obtain a recommended color distribution by analyzing the obtained indoor image and an input image.

In operation 2250, the electronic apparatus 100 may obtain a hand image of the user and generate and display a magic hand by applying the obtained recommended color distribution to the hand image.

The electronic apparatus 100 may obtain a hand image of a user by using a camera, and generate a magic hand by mapping at least one color included in the recommended color distribution to the obtained hand image. The electronic apparatus 100 may display a preview image of the generated magic hand on the display.

According to an embodiment, the electronic apparatus 100 may update at least one color mapped to a magic hand based on properties of a partial region of an input image processed according to a magic hand and a hand gesture of a user. The properties of the partial region may include various features of an image such as a shape or a size of an object drawn on the partial region of the image or a color or texture used in the partial region. For example, when a user has processed a partial region of an input image by using a certain color tone, the electronic apparatus 100 may modify or update at least one color mapped to a magic hand by reflecting the properties of the color tone processed in the partial region. By adaptively updating a magic hand in a direction in which a user intends to control image processing, as described above, a convenient and fun user experience may be provided to the user.

Figure 23:
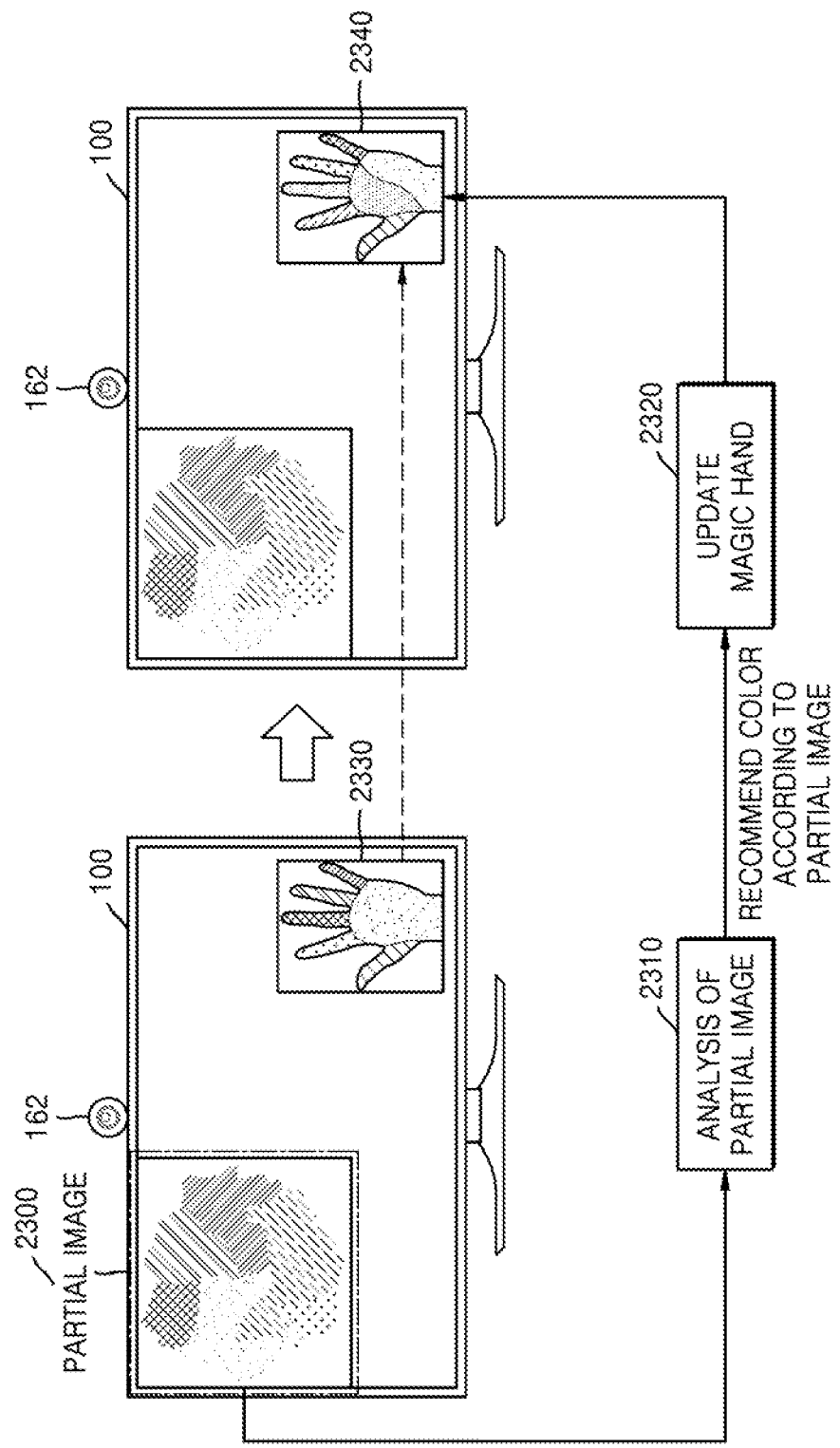
FIG. 23 is a reference diagram for describing an example of updating, by an electronic apparatus, at least one color mapped to a magic hand based on properties of a partial region of an input image processed according to a magic hand and a hand gesture of a user, according to an embodiment.

FIG. 23 is a reference diagram for describing an example of updating, by the electronic apparatus 100, at least one color mapped to a magic hand based on properties of a partial region of an input image processed according to a magic hand and a hand gesture of a user, according to an embodiment.

Referring to FIG. 23, the electronic apparatus 100 displays a magic hand preview image 2330. The user may perform image processing control on a partial region of an image by using a magic hand to draw a shape in or color the partial region. The electronic apparatus 100 may analyze a partial image 2300 generated in the partial region of the image (2310). For example, the electronic apparatus 100 may extract features of the partial image 2300 and may obtain a recommended color distribution by analyzing the extracted features, for example, color, texture, shape of an object, or the like. The electronic apparatus 100 may reflect the obtained recommended color distribution in the magic hand to update the magic hand (2320). The electronic apparatus 100 may display a preview image 2340 of the updated magic hand on the display. Then the user may use the updated magic hand in image processing control.

For example, when the user has performed image processing by using mainly red tone colors in the partial image, the user is determined as a person who likes red tone colors and thus the electronic apparatus 100 may include various red tone colors in the magic hand when updating the magic hand. Alternatively, when the user has controlled image processing by using mainly red tone colors in the partial image, the electronic apparatus 100 may include in the magic hand blue tone colors that can harmoniously match the red tone colors when updating the magic hand. When updating the magic hand, what colors are to be added or removed may be determined in various ways according to system policy.

According to an embodiment, update of a magic hand may be performed in real time, may be performed at regular time intervals, or may be performed according to a size of the area of the partial image, or when colors used by the user are modified.

While FIG. 23 shows that the magic hand is updated using a result of analyzing the partial image 2300 when updating the magic hand, the disclosure is not limited thereto. For example, also when a user has performed image processing control not on a partial region of an image but overall on the entire region of the image displayed on the display, the electronic apparatus 100 may obtain a recommended color distribution by analyzing a resultant image obtained by performing image processing control in a certain point of time, and may update the magic hand by using the obtained recommended color distribution. For example, after performing image processing control by using the magic hand, the electronic apparatus 100 may update the magic hand every ten minutes, for example.

According to an embodiment, the electronic apparatus 100 may transmit a generated magic hand or a user created content generated using the magic hand to a server computer to upload the same, and may also receive a magic hand generated by another user or a user created content generated by another user, from the server computer. Accordingly, a user may access abundant magic hand-related contents and usability of the server computer may be extended.

Figure 24:
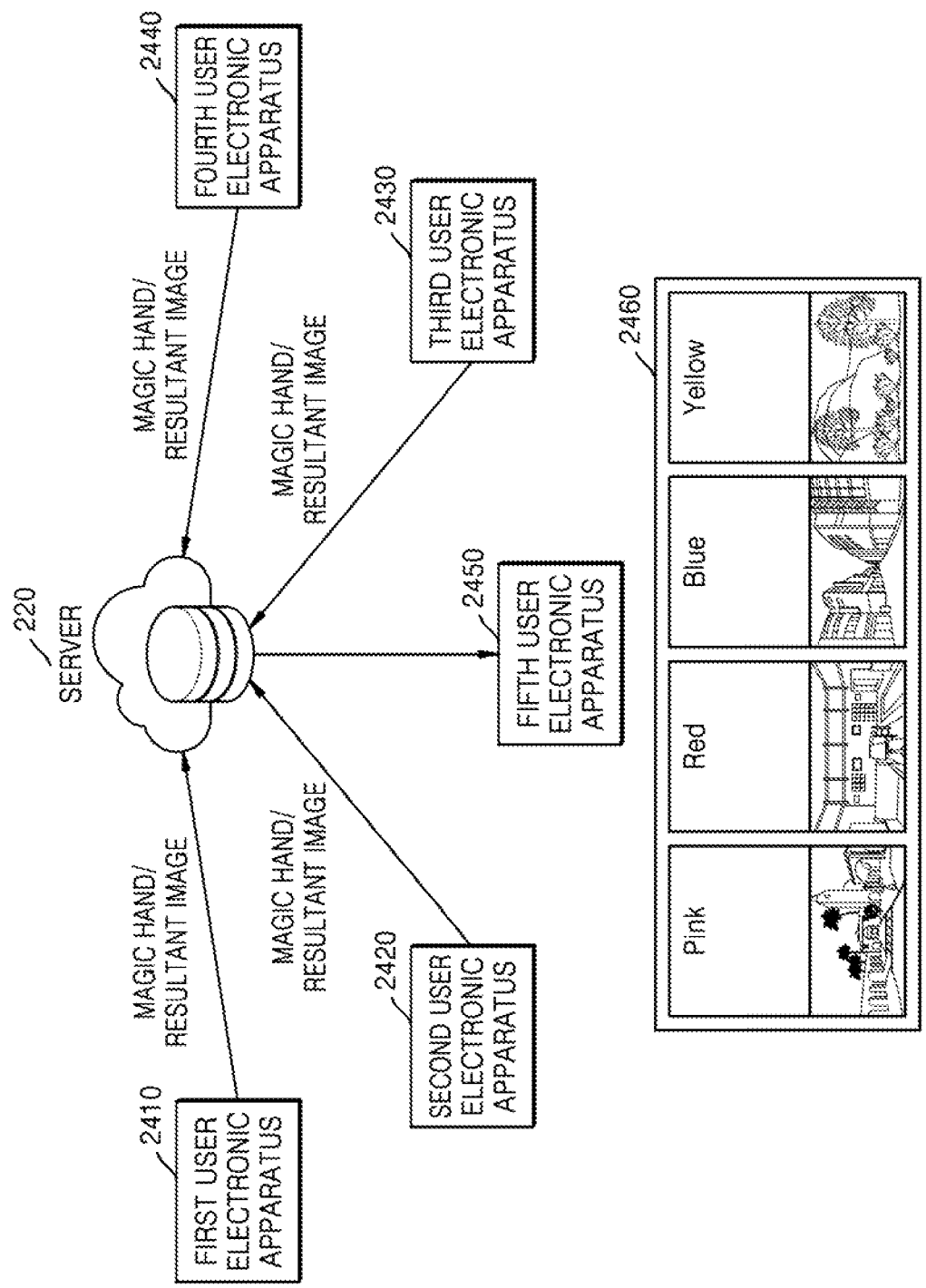
FIG. 24 is a reference diagram for describing an example of uploading a magic hand or a user created content generated using a magic hand by transmitting the magic hand or the user created content to a server computer and also receiving, from a server computer, a magic hand generated by another user or a user created content generated by the other user, according to an embodiment.

FIG. 24 is a reference diagram for describing an example of uploading a magic hand or a user created content generated using a magic hand by transmitting the magic hand or the user created content to a server computer and also receiving, from a server computer, a magic hand generated by another user or a user created content generated by the other user, according to an embodiment.

Referring to FIG. 24, a system may include a server 220, a first user electronic apparatus 2410, a second user electronic apparatus 2420, a third user electronic apparatus 2430, a fourth user electronic apparatus 2440, and a fifth user electronic apparatus 2450. The server 220 and each user electronic apparatus may communicate with each other through a communication network. Each user's electronic apparatus may upload a magic hand generated by each electronic apparatus or a resultant image generated using the magic hand to the server 220. The server 220 may establish a database by using the magic hands received from each user's electronic apparatus and resultant images by using the magic hands, and provide a user interface to allow users to search for desired magic hands and resultant images. The server 220 may provide, for example, a user interface 2460. Then, the users may access the server 220 and download and use a magic hand that each user wishes or a resultant image obtained by using the magic hand. The user interface 2460 indicates a screen in which magic hands or resultant images obtained using the magic hands are classified by color. For example, when a user wants a magic hand or resultant images of red tone colors, the user may easily search through a menu.

As control of image processing by using a magic hand generated based on an indoor image or an input image may be performed as described above, intuitive user experience may be provided.

Figure 25:
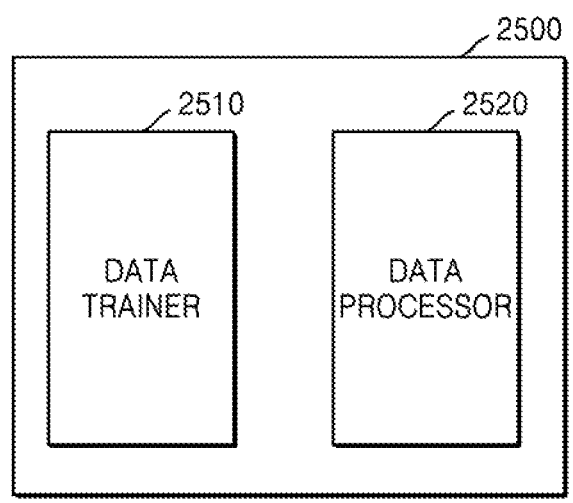
FIG. 25 is a block diagram showing a configuration of a processor from an aspect of learning and an aspect of processing of a neural network according to an embodiment.

FIG. 25 is a block diagram showing a configuration of a processor according to an embodiment from an aspect of learning and an aspect of processing of a neural network.

Referring to FIG. 25, a processor 2500 according to an embodiment may include a data trainer 2510 and a data processor 2520.

The data trainer 2510 may extract at least one feature from at least one of an input image or an indoor image to train a neural network, according to an embodiment, and may perform training to determine a recommended color distribution on condition of the extracted at least one feature.

Data processing models may be constructed in consideration of the application field of a recognition model, the purpose of learning, or the computer performance of a device. The data processing models may be, for example, a model based on a neural network. For example, models such as a deep neural network (DNN), a recurrent neural network (RNN), or a bidirectional recurrent deep neural network (BRDNN) may be used as a data processing model, but are not limited thereto.

In addition, the data trainer 2510 may train data processing models by using, for example, a learning algorithm including error back-propagation or gradient descent.

In addition, the data trainer 2510 may train a data processing model through, for example, supervised learning by using training data as an input value. Also, for example, the data trainer 2510 may train a data processing model through unsupervised learning, in which a model works on its own to learn types of data required for data processing without any special supervising and discovers criteria for data processing. Also, the data trainer 2510 may train a data processing model through reinforcement learning using feedback as to whether a result value according to learning is correct, for example.

Also, when a data processing model is trained, the data trainer 2510 may store the trained data processing model. In this case, the data trainer 2510 may store the trained data processing models in a memory of an electronic apparatus. Alternatively, the data trainer 2510 may store the trained data processing model in a memory of a server connected to an electronic apparatus through a wired or wireless network.

The data processor 2520 may input at least one of an input image or an indoor image to the data processing model including the trained neural network and output a recommended color distribution based on at least one of the input image or the indoor image therefrom. An output result value may be used to update the data processing model including the neural network.

At least one of the data trainer 2510 or the data processor 2520 may be manufactured in the form of at least one hardware chip and mounted on an electronic apparatus. For example, at least one of the data trainer 2510 or the data processor 2520 may be manufactured in the form of a dedicated hardware chip for AI or manufactured as a portion of an existing general-purpose processor (e. g., a CPU or application processor) or of a graphics-only processor (e.g., GPU) and mounted.

Also, the data trainer 2510 and the data processor 2520 may provide model information constructed by the data trainer 2510 to the data processor 2520 in a wired or wireless manner, or data input to the data processor 2520 may be provided to the data trainer 2510 as additional learning data.

At least one of the data trainer 2510 or the data processor 2520 may be implemented as a software module. When at least one of the data trainer 2510 or the data processor 2520 is implemented as a software module (or a program module including an instruction), the software module may be stored in a non-transitory computer-readable recording medium. Also, in this case, at least one software module may be provided by an operating system (OS) or a certain application. Alternatively, some of software modules may be provided by an OS, and some others may be provided by a certain application.

The data trainer 2510 and the data processor 2520 may be mounted in a single electronic apparatus or may be respectively mounted in different electronic apparatuses. For example, one of the data trainer 2510 and the data processor 2520 may be included in an electronic apparatus, and the other may be included in a server.

According to an example, the data trainer 2510 and the data processor 2520 may be mounted in a user electronic apparatus and learning and data processing may be both performed in the user electronic apparatus.

According to an example, the data trainer 2510 may be mounted in a server and trained there, and then the data trainer 2510 including a model, of which training is completed, may be mounted in a user electronic apparatus.

Figure 26A:
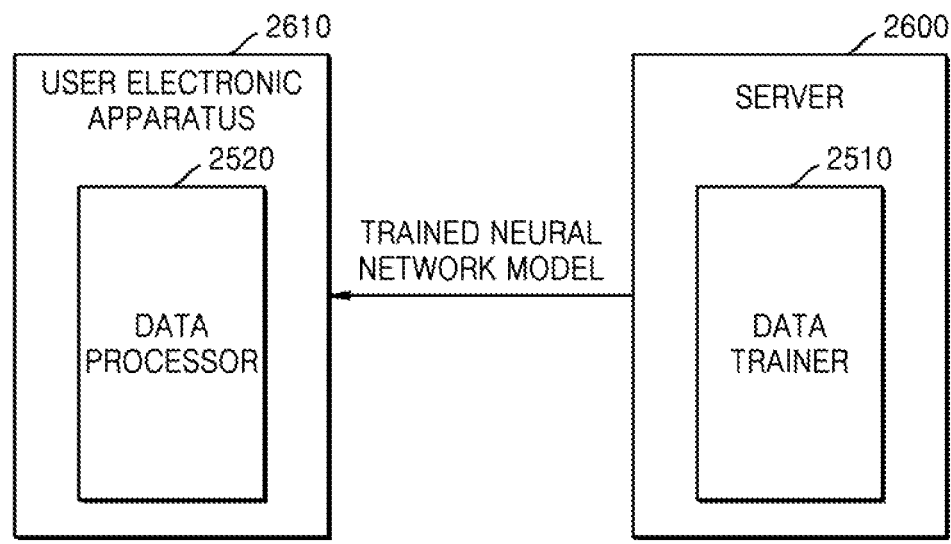
FIG. 26A is a diagram showing an example in which a data trainer is mounted in a server and a data processor is mounted in a user electronic apparatus, according to an embodiment.

FIG. 26A shows an example in which a data trainer is mounted in a server and a data processor is mounted in a user electronic apparatus, according to an embodiment.

Referring to FIG. 26A, a server 2600 may obtain a neural network model by learning a method of obtaining a recommended color distribution from an image according to an embodiment, by using the data trainer 2510. In addition, the server 2600 may provide the trained neural network model to a user electronic apparatus 2610. The user electronic apparatus 2610 may implement the data processor 2520 by using the trained neural network model received from the server 2600. When the user electronic apparatus 2610 is to obtain a recommended color distribution from an input image or an indoor image, the user electronic apparatus 2610 may obtain a recommended color distribution from the input image or the indoor image by using the data processor 2520 mounted in the user electronic apparatus 2610 without the need for communication with a server.

Figure 26B:
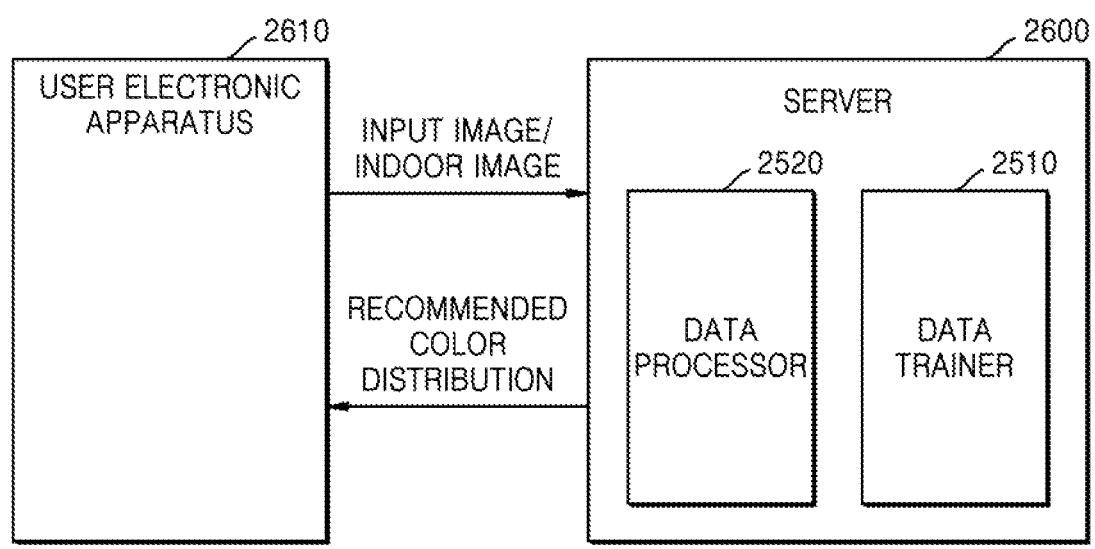
FIG. 26B is a diagram showing an example in which a data trainer and a data processor are both mounted in a server, according to an embodiment.

FIG. 26B shows an example in which a data trainer 2510 and a data processor 2520 are both mounted in a server, according to an embodiment.

Referring to FIG. 26B, both the data trainer 2510 and the data processor 2520 are mounted in a server 2600. Thus, the server 2600 may obtain a neural network model by learning a method of obtaining a recommended color distribution from an input image or an indoor image according to an embodiment, by using the data trainer 2510, and may implement the data processor 2520 by using the obtained neural network model.

For some operations of a magic hand function, when the user electronic apparatus 2610 transmits at least one of an input image or an indoor image to the server 2600, the server 2600 may obtain a recommended color distribution based on at least one of the input image or the indoor image by using the mounted data processor 2520, and may transmit the obtained recommended color distribution to the user electronic apparatus 2610.

When color processing or the like is performed on an input image by using a magic hand, a user may want to perform color processing on an object included in the input image. In addition, when a size of an object included in the input image is relatively small, it may be difficult for the user to express the object in detail by using the magic hand. Accordingly, in consideration of this situation, an electronic apparatus may provide a method of recognizing at least one object included in an input image and processing each object by using a magic hand.

Figure 27:
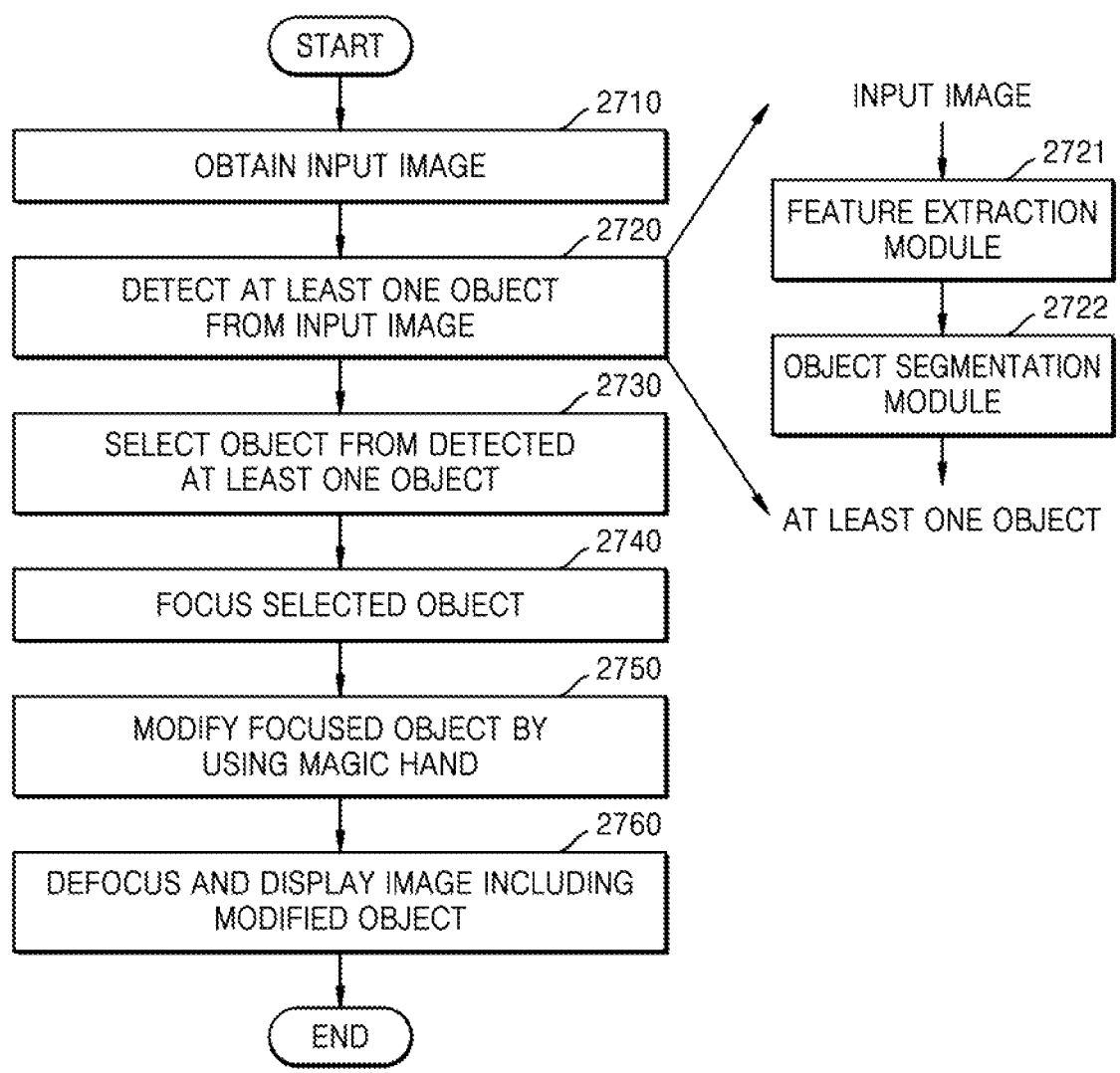
FIG. 27 is a flowchart of a method of processing each of at least one object included in an input image by using a magic hand, according to an embodiment.

FIG. 27 shows an example of a method of processing at least one object included in an input image by using a magic hand, according to an embodiment.

Referring to FIG. 27, in operation 2710, the electronic apparatus 100 may obtain an input image.

In operation 2720, the electronic apparatus 100 may detect at least one object from the input image.

According to an embodiment, after obtaining an input image, the electronic apparatus 100 may automatically detect at least one object from the input image.

According to an embodiment, as the electronic apparatus 100 receives a user input of requesting object detection from the input image, the electronic apparatus 100 may detect at least one object from the input image. For example, the electronic apparatus 100 may determine a specific gesture corresponding to an object detection request, and may perform an operation of detecting at least one object from an input image when a user input of performing the specific gesture is received. Alternatively, the electronic apparatus 100 may provide a specific menu corresponding to an object detection request, and may perform an operation of detecting at least one object from an input image when a user input of selecting the specific menu is received.

According to an embodiment, the electronic apparatus 100 may use at least one neural network to detect at least one object from an input image.

According to an embodiment, in order to detect at least one object from an input image, the electronic apparatus 100 may use a feature extraction module 2721 extracting features of the input image by using a first neural network and an object segmentation module 2722 recognizing at least one object from the input image by using a second neural network based on the features of the input image.

According to an embodiment, the feature extraction module 2721 may extract features from the input image by using the first neural network. As a feature extraction model, in addition to a CNN, networks such as VGG, MobileNet, ResNet, and Feature Pyramid Network (FPN) may be used.

According to an embodiment, the object segmentation module 2722 may receive a feature map extracted from an input image, and recognize at least one object of the input image from the feature map of the input image by using the second neural network. The second neural network used by the object segmentation module 2722 to recognize at least one object from an input image may include, for example, a Mask R—CNN. However, the above-described neural networks are examples, and various networks capable of recognizing an object from features of an image may be used.

In operation 2730, the electronic apparatus 100 may select an object from the detected at least one object.

According to an embodiment, the electronic apparatus 100 may display at least one object detected from an input image and receive a user input of selecting an object from among the at least one displayed object.

According to an embodiment, the electronic apparatus 100 may display a bounding box surrounding each object with respect to each, at least one object detected from an input image to thereby display that each object is detected.

According to an embodiment, the electronic apparatus 100 may display identification information or an identification number corresponding to each of at least one object detected from an input image, and receive a user input of selecting the displayed identification information or identification number. For example, the electronic apparatus 100 may display number information such as number 1, number 2, and number 3 with respect to an object detected from an input image, and may select an object by receiving a user input of selecting the number information. For example, a user input of selecting identification information or an identification number may be received through gesture recognition by using a camera, through an input of a number key by using a remote controller, and via voice speech recognition by using a microphone.

In operation 2740, the electronic apparatus 100 may focus the selected object.

According to an embodiment, the electronic apparatus 100 may display the selected object in a new, popped-out window to focus the selected object. For example, the electronic apparatus 100 may place a new, popped out window on a layer of an input image as an overlay. For example, the electronic apparatus 100 may reduce a size of the input image and display the input image with the reduced size on a portion of a screen, and display the popped out, new window on a main portion of the screen.

In operation 2750, the electronic apparatus 100 may modify or process the focused object by using a magic hand.

According to an embodiment, the electronic apparatus 100 may perform color processing on the object displayed in the popped out, new window by using the magic hand as described above.

In operation 2760, the electronic apparatus 100 may defocus the object and display an image including the modified object.

According to an embodiment, when color processing of the focused object is completed, the electronic apparatus 100 may defocus the focused object and apply the color-processed object to the input image and display the input image on the screen.

According to an embodiment, the electronic apparatus 100 may defocus the focused object upon receiving a user input indicating that the color processing of the focused object is completed. The user input indicating that the color processing of the focused object is completed may be received through gesture recognition by using a camera, through an input of a key by using a remote controller, and via voice speech recognition by using a microphone.

Figure 28:
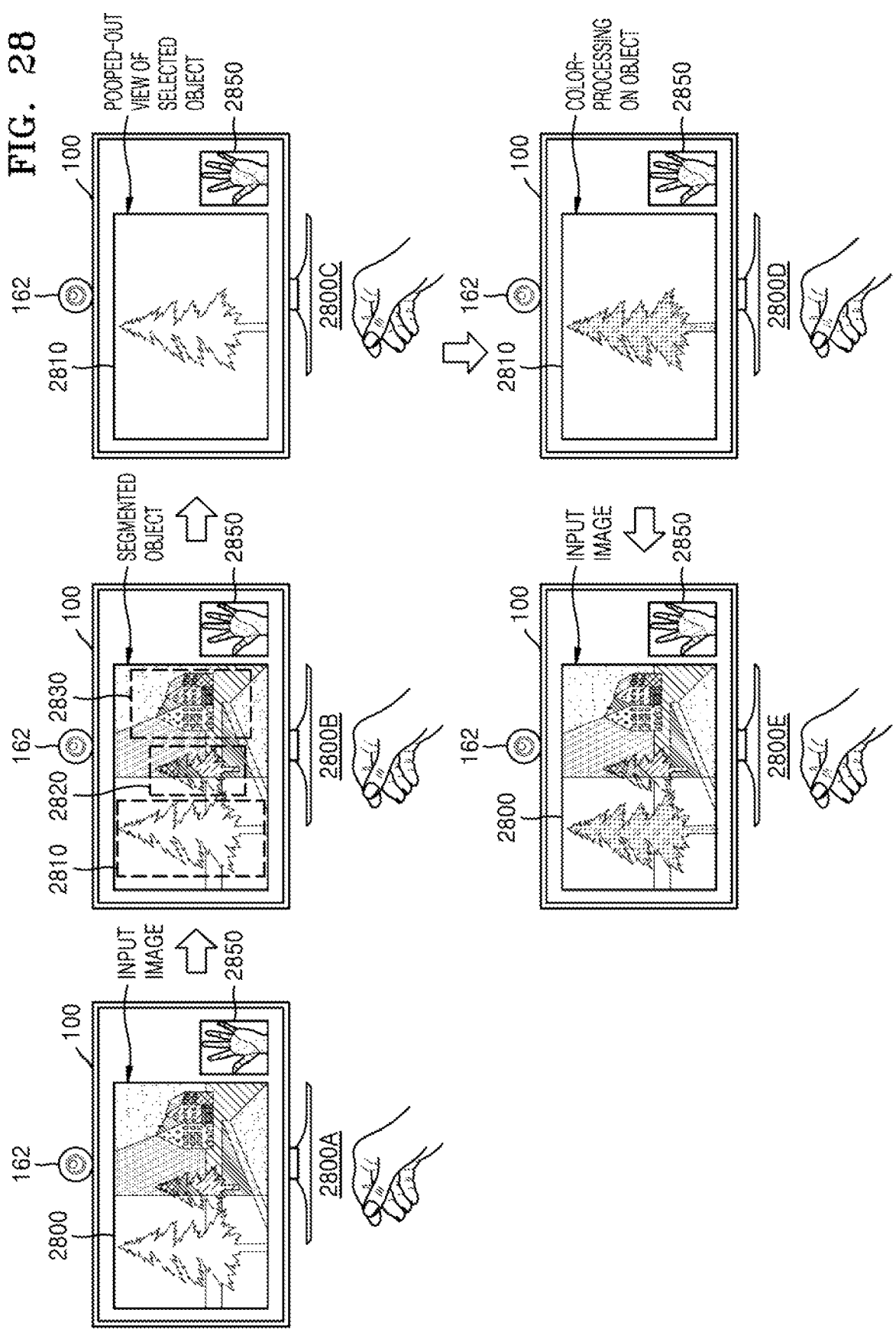
FIG. 28 is a reference diagram for describing an operation of performing color processing by selecting an object from an input image, according to an embodiment.

FIG. 28 is a reference diagram for describing an operation of color processing performed by selecting an object from an input image, according to an embodiment.

Referring to FIG. 28, in 2800A, the electronic apparatus 100 may display a magic hand preview image 2850 to be used to color-process an input image 2800, together with the input image 2800. In the state of 2800A, a user may process an object of the input image 2800 with a desired color by using the magic hand preview image 2850 on the input image 2800, but when the user focuses a specific object among objects included in the input image 2800 and displays the object by enlarging it, the user may perform color processing thereon. To this end, the electronic apparatus 100 may receive various user inputs of requesting detection of objects from an input image.

In 2800B of FIG. 28, the electronic apparatus 100 may detect at least one object from the input image 2800 according to a user input of requesting object detection from the input image 2800, and display the detected at least one object by using a bounding box. For example, in the input image 2800, the electronic apparatus 100 may display an object 2810 representing a large tree, an object 2820 representing a small tree, and an object 2830 representing a house, by using a bounding box.

In order to simplify a user input of selecting an object from among the plurality of objects, number information may be displayed on a bounding box corresponding to each object. For example, identification number 1 may be displayed on the object 2810, identification number 2 on the object 2820, and identification number 3 on the object 2830. When assigning an identification number to each recognized object as described above, the user may easily select an object by pressing a key corresponding to the identification number by using a remote controller or by uttering a word corresponding to the identification number. For example, the user may select the object 2810 by voicing "1" or selecting 1 on a remote controller.

In 2800C of FIG. 28, the electronic apparatus 100 may focus and display the object 2810 selected by the user. For example, the electronic apparatus 100 may display the selected object in a new, popped-out window. The electronic apparatus 100 may also enlarge a size of the object 2810 and display the object 2810 in the new, popped-out window, thereby enabling the user to perform color processing.

In 2800D of FIG. 28, the user may perform color processing on the popped out object 2810 by using a magic hand with respect to a color of the magic hand preview image 2850. When the color processing of the object 2810 is completed, the user may make a specific input of instructing to defocus the selected object.

In 2800E of FIG. 28, according to a user input of defocusing the object, the electronic apparatus 100 may reflect the colored object 2810 in the input image 2800 and display the input image 2800 including the colored object 2810.

Digital TVs (DTVs) may provide added value and enhance aesthetic experience by supplementing the lifestyle of consumers through decorative contents such as personal photos, artwork, weather forecasts, weather information, or playing music in the background. These functions may be provided in a dedicated screen mode called 'ambient mode' or 'frame mode.' A technique of color-processing an input image displayed on an electronic apparatus disclosed in the disclosure by using a magic hand may be used in the ambient mode or the frame mode described above. In addition, while the user color-processes the input image displayed on the electronic apparatus by using the magic hand, the input image that is modified in real time may be analyzed and an audio that is suitable for the input image may be generated or recommended, thereby enabling the user to enjoy audio-visual contents.

Figure 29:
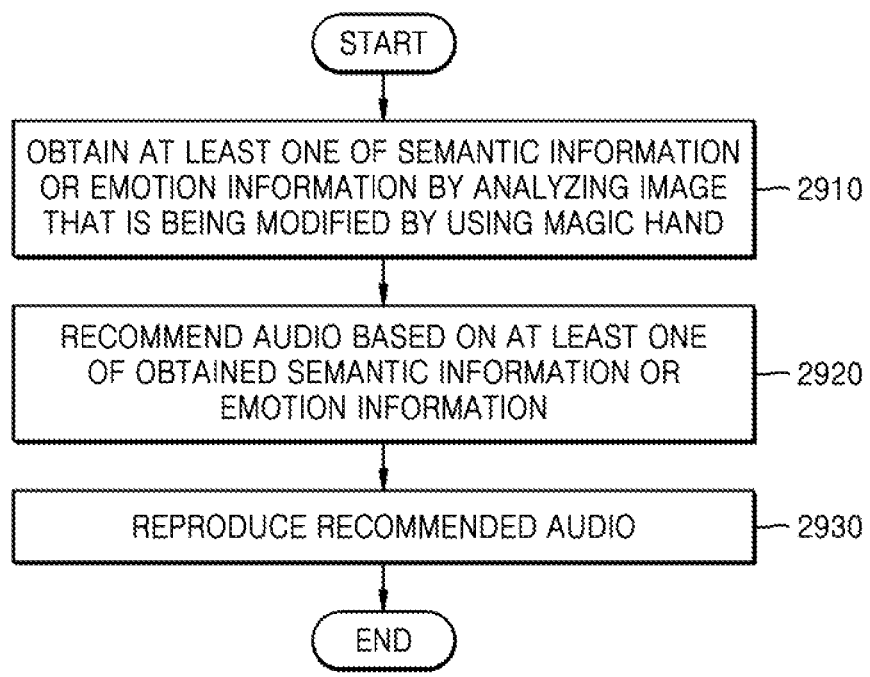
FIG. 29 is a flowchart of a method, performed by an electronic apparatus, of outputting an audio while processing an input image by using a magic hand, according to an embodiment.

FIG. 29 is a flowchart of a process of a method, performed by an electronic apparatus, of outputting an audio while processing an input image using a magic hand, according to an embodiment.

Referring to FIG. 29, in operation 2910, the electronic apparatus 100 may obtain at least one of semantic information or emotion information by analyzing an image that is being modified using a magic hand.

According to an embodiment, while the user modifies or color-processes an input image by using a magic hand, the electronic apparatus 100 may analyze the input image being modified in real time or at regular time intervals to obtain at least one of semantic information or emotion information.

According to an embodiment, the electronic apparatus 100 may use at least one neural network to obtain at least one of semantic information or emotion information by analyzing an input image.

According to an embodiment, the electronic apparatus 100 may obtain at least one of semantic information or emotion information of an input image by using a neural network that obtains metadata corresponding to a feature of the input image from the input image. At least one neural network may learn a method of obtaining semantic information and image emotion information corresponding to a plurality of training images in response to input of the plurality of training images, and a learning model may be generated based on a training result.

According to an embodiment, the electronic apparatus 100 may receive an input image, extract a feature from the input image by using a plurality of layers and use a first neural network that extracts semantic information or semantic styles based on the extracted feature.

According to an embodiment, the electronic apparatus 100 may receive an input image and determine an emotion composition based on a feature of the input image and use a second neural network that outputs emotion information as a result.

In operation 2920, the electronic apparatus 100 may recommend audio based on at least one of the obtained semantic information or emotion information.

According to an embodiment, the electronic apparatus 100 may generate audio based on at least one of the obtained semantic information or emotion information.

According to an embodiment, the electronic apparatus 100 may recommend an appropriate audio based on at least one of the obtained semantic information or emotion information. Here, when the electronic apparatus 100 provides at least one of the obtained semantic information or emotion information to an external server, the external server may recommend suitable music based on at least one of the semantic information or emotion information, and provide a recommend music or a recommended music list to the electronic apparatus 100.

In operation 2930, the electronic apparatus 100 may reproduce a recommended audio or a generated audio while the user performs color processing of the input image by using the magic hand.

Figure 30:
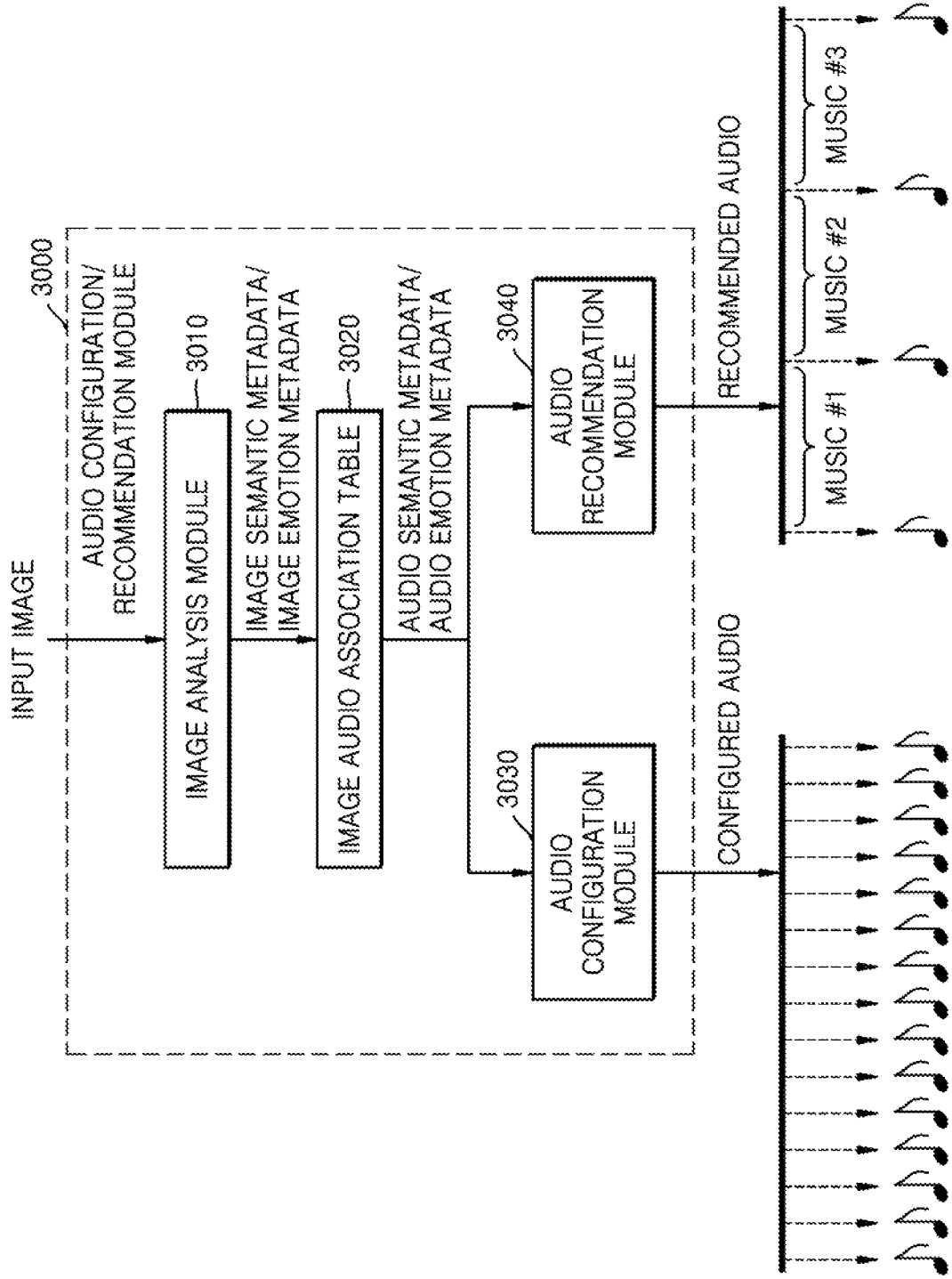
FIG. 30 is a diagram showing an example of an audio configuration/recommendation module that recommends or configures an audio by analyzing an input image, according to an embodiment.

FIG. 30 shows an example of an audio configuration/recommendation module that recommends or configures an audio by analyzing an input image, according to an embodiment.

Referring to FIG. 30, an audio configuration/recommendation module 3000 may include an image analysis module 3010, an image audio association table 3020, an audio configuration module 3030, and an audio recommendation module 3040.

The image analysis module 3010 may receive an input image and analyze the input image to output semantic metadata and/or image emotion metadata of the input image. In detail, the image analysis module 3010 may extract, from the input image, color-based statistical features, shape-based statistical features, and panorama-based statistical features. After extracting primitive features as above, the image analysis module 3010 may segment the features by performing partial statistical analysis such as average, dispersion, skewness, curtosis, or the like. The above statistical features may be used as an input to a pre-trained deep learning model to determine a semantic style and an emotion composition of an image.

According to an embodiment, the image analysis module 3010 may determine a style of an image according to a category of the image. For example, when a category of an image is a photograph, based on objects and backgrounds shown in the photograph, semantic information may be determined as to whether the photograph is about nature or people, and when about nature, whether the photograph is about travel, and when about people, whether the photograph is about family or a group. For example, when a category of an image is artwork, semantic information about the era of the artwork, the genre of the artwork, and the method of expressing the artwork may be determined. Image semantic metadata may have semantic metadata that is distinguished according to whether an input image is a photograph or artwork. For example, in the case of a photograph, image semantic metadata may include semantic metadata indicating whether the photograph is about a landscape or family. For example, in the case of artwork, image semantic metadata may include semantic metadata representing genre information, such as abstractionism, impressionism, or folk.

According to an embodiment, the image analysis module 3010 may extract an image feature from an input image, for example, an image feature, such as a color distribution, to be used to map the image to one of standard emotion models used in human psychology. Examples of the standard emotion models include Pleasure-Arousal-Dominance (PAD) model, or a Valence-Arousal (V-A) model also known as a Circumplex Model of emotion. For example, according to the emotion composition in the Valance-Arousal model, an emotion composition graph may be obtained by using brightness and chromaticity of each pixel of the image. For example, in the emotion composition graph, the rightward direction represents a pleasant emotion and the leftward direction represents an unpleasant emotion. In addition, an upward direction represents a more powerful emotion, and a downward direction represents a gentler and calmer feeling. For example, a high degree of pleasant feelings and strong feelings draw emotions such as delight or happiness; and a high degree of unpleasant and calm feelings may draw emotions such as boredom or depression. For example, emotional metadata for each image by using the above method may include calmness, excitedness, sadness, tiredness, relaxed feelings, and the like.

The image audio association table 3020 may refer to a table in which semantic metadata of an image and/or emotion metadata of an image are associated with semantic metadata of audio and/or emotion metadata of audio. Thus, when the semantic metadata of the image and/or the emotion metadata of the image are input to the image audio association table 3020, the image audio association table 3020 may output audio semantic metadata and/or audio emotion metadata mapped to the input image semantic metadata and/or image emotion metadata. Audio semantic metadata may include, for example, genre, era, composer, and the like, and audio emotion metadata may include, for example, balance, tempo, energy, and the like.

The audio configuration module 3030 may receive the audio semantic metadata and/or audio emotion metadata output from the image audio association table 3020 and generate audio based on the received metadata. As the audio configuration module 3030 configures, that is, generates an audio in real time based on metadata, the audio configuration module 3030 may configure an audio according to an input image that is modified in real time while a user modifies the input image by using a magic hand. For example, the audio configuration module 3030 may adaptively configure and output an audio in real time according to a change in an image each time when a user modifies an input image by using a gesture by using a magic hand. The audio configuration module 3030 may receive music parameters such as tempo, genre, or pitch as an input and compose music by using a music-composing AI model. The audio configuration module 3030 may use any AI-based technology to compose music. The audio configuration module 3030 may not only compose music but may also configure audio effects or a special sound such as a sound of falling rain, a sound of wind blowing, or an atmosphere.

The audio recommendation module 3040 may receive the audio semantic metadata and/or audio emotion metadata output from the image audio association table 3020 and recommend audio based the received metadata. The audio recommendation module 3040 may include an audio recommendation program and thus directly recommend an audio. Alternatively, the audio recommendation module 3040 may provide the audio semantic metadata and/or audio emotion metadata to an external music recommendation server and receive recommended music from the external music recommendation server and output the recommended music. For example, when a music is recommended while modifying an image by using a magic hand, typically, a piece of music continues from three to five or six minutes, and thus, by analyzing the image modified using the magic hand again at a point of time near the end of a piece of a recommended music, new music may be recommended based on the analyzed content of the image.

Figure 31:
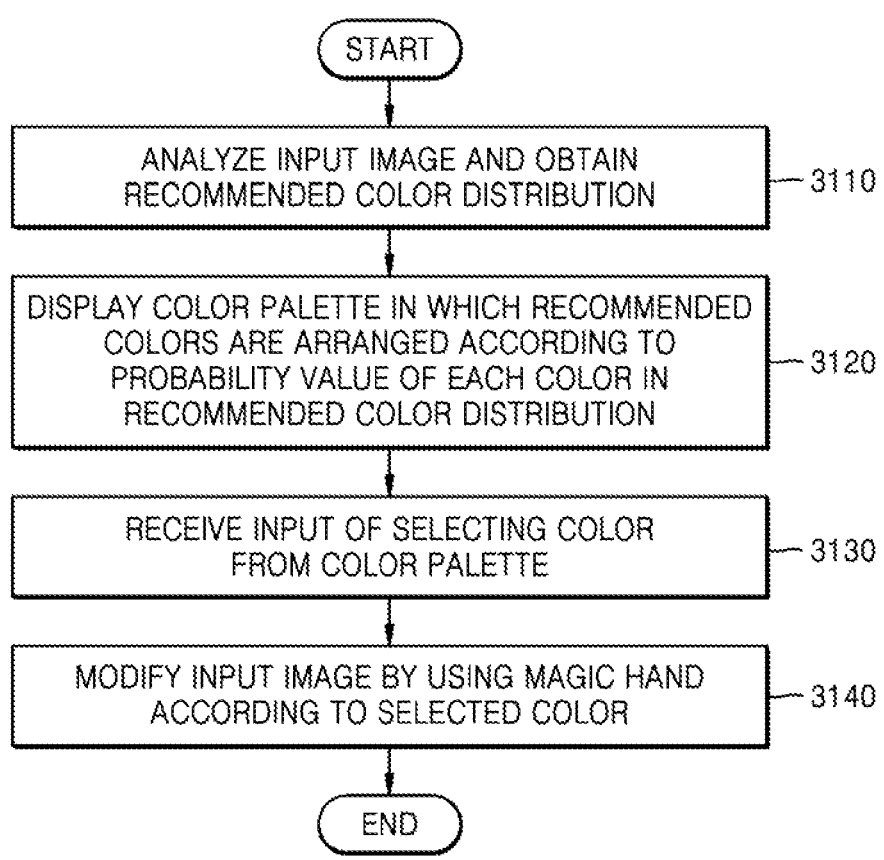
FIG. 31 a flowchart of a method of providing a color palette by using a recommended color distribution obtained as a result of input image analysis, according to an embodiment.

FIG. 31 shows an example of a process of a method of providing a color palette by using a recommended color distribution obtained as a result of input image analysis, according to an embodiment.

Referring to FIG. 31, in operation 3110, the electronic apparatus 100 may analyze an input image and obtain a recommended color distribution. The method, performed by the electronic apparatus 100, of analyzing an input image and obtaining a recommended color distribution is as described above with reference to FIGS. 7 through 10.

In operation 3120, the electronic apparatus 100 may display a color palette in which recommended colors are arranged according to a probability value of each color in the recommended color distribution.

According to an embodiment, the electronic apparatus 100 may display a color palette in which recommended colors are arranged in an order of a higher probability value of each color in a recommended color distribution.

Figure 32:
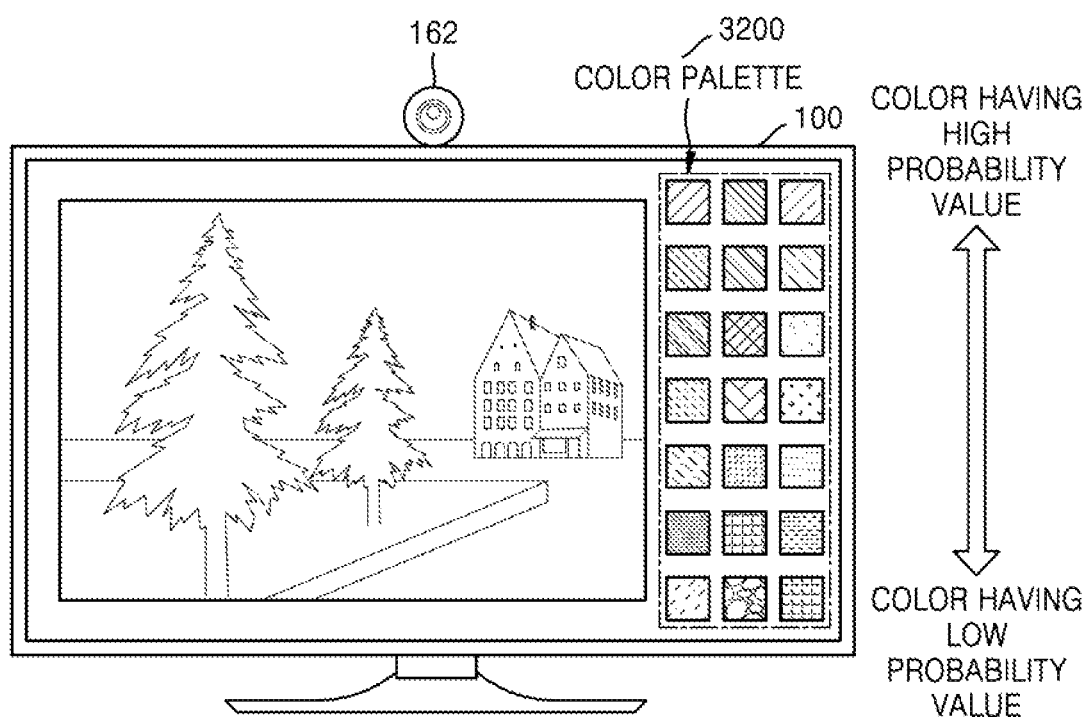
FIG. 32 shows a screen on which a color palette is displayed, according to an embodiment.

FIG. 32 shows a screen on which a color palette is displayed, according to an embodiment.

Referring to FIG. 32, the electronic apparatus 100 may display a color palette 3200 in a portion of a screen on which an input image is displayed. A plurality of colors may be arranged in the color palette 3200. In the color palette 3200, colors having a higher recommendation probability values are arranged toward an upper end and colors having a lower recommendation probability values are arranged toward a lower end.

In operation 3130, the electronic apparatus 100 may receive an input of selecting a color from a color palette. For example, the electronic apparatus 100 may receive a user input of selecting a color from a gesture-controlled color palette or receive a user input of selecting a color from a color palette by moving a direction key of a remote controller.

In operation 3140, the electronic apparatus 100 may modify an input image or perform color processing by using a magic hand according to the color selected by the user input.

The operating methods of the electronic apparatus according to the embodiments may be embodied as program commands executable by various computer means and may be recorded on a computer-readable recording medium. The computer readable recording medium may include program commands, a data file, a data structure etc. alone or in combination. The program commands written to the computer readable recording medium may be specifically designed and configured for the embodiments or may be well-known and available to one of ordinary skill in the art. Examples of the computer readable recording medium include magnetic media (e.g., hard disks, floppy disks, magnetic tapes, etc.), optical media (e.g., CD-ROMs, or DVDs), magneto-optical media (e.g., floptical disks), and hardware devices specifically configured to store and execute program commands (e.g., ROM, RAM, flash memories, etc.). Examples of the program commands include advanced language codes that can be executed by a computer by using an interpreter or the like as well as machine language codes made by a compiler.

According to the various embodiments, users may intuitively control image processing by using an electronic apparatus. According to the embodiments, when controlling image processing or generating a new image by using an electronic apparatus, users may intuitively control colors by using a magic hand, without the need for manually selecting or modifying a color which is a property used in image processing control, and may thus conveniently use an image processing control function.

According to the various embodiments, users may intuitively generate a new image by using an electronic apparatus.

According to the various embodiments, users who are remote from each other may intuitively control image processing by using an electronic apparatus.

While one or more embodiments have been described with reference to the figures, the scope of the disclosure is not limited thereto, and it will be understood by those of ordinary skill in the art that various changes in form and details may be made therein without departing from the spirit and scope as defined by the following claims.

What is claimed is:

1. An electronic apparatus comprising:
a memory storing at least one instruction; and
at least one processor configured to execute the at least one instruction to:
analyze at least one of an input image or a captured image and obtain a recommended color distribution including at least one color based on the at least one of the input image or the captured image, the captured image being obtained by capturing an image of an environment of the electronic apparatus,
control a display to display the input image,
obtain a hand image by capturing an image of a hand of a user and generate a magic hand by mapping a color to the obtained hand comprising a color mapping image based on the recommended color distribution, and
detect a gesture of the hand of the user and control colors of the input image displayed on the display based on the detected hand gesture and the color mapping of the magic hand.

2. The electronic apparatus of claim 1, wherein the at least one processor is further configured to execute the at least one instruction to obtain the recommended color distribution based on the at least one of the input image or the captured image by using at least one neural network.

3. The electronic apparatus of claim 1, wherein the recommended color distribution comprises at least one of a color distribution obtained from the captured image, a color distribution obtained from the input image, or a color distribution obtained by reflecting the color distribution of the captured image to the color distribution obtained from the input image.

4. The electronic apparatus of claim 1, wherein the at least one processor is further configured to execute the at least one instruction to:
convert, based on the input image being a color image, the input image expressed in color into a black and white image; and
control the display to display the black and white image.

5. The electronic apparatus of claim 1, wherein the at least one processor is further configured to execute the at least one instruction to perform an operation of at least one of modifying, adding, or removing at least one color mapped to the magic hand, according to a user input.

6. The electronic apparatus of claim 1, wherein the at least one processor is further configured to execute the at least one instruction to control the display to display a preview image of the magic hand.

7. The electronic apparatus of claim 1, wherein the at least one processor is further configured to execute the at least one instruction to:
generate a plurality of magic hands,
control the display to display a plurality of preview images of the plurality of magic hands, and
wherein each of the plurality of magic hands respectively correspond to different users.

8. The electronic apparatus of claim 7, wherein the at least one processor is further configured to execute the at least one instruction to:

detect interaction gestures of hands of the different users respectively corresponding to the plurality of magic hands; and provide color effects to each of the plurality of magic hands displayed on the display according to the detected interaction gestures.

9. The electronic apparatus of claim 1, wherein the at least one processor is further configured to execute the at least one instruction to:

share, via screen sharing, the input image with an external apparatus that is remotely connected;

perform color control on at least a portion of the shared input image according to the hand gesture of the user of the electronic apparatus;

receive a color display of at least another portion of the input image which has the colors that are controlled according to a hand gesture of the user of the external apparatus; and control the display to display the color display.

10. The electronic apparatus of claim 1, wherein the at least one processor is further configured to execute the at least one instruction to update the magic hand by analyzing a feature of at least a partial region of the input image on which a picture is drawn, based on the gesture of the hand of the user, and modifying at least one color mapped to the magic hand based on the feature.

11. An operating method of an electronic apparatus, the operating method comprising:

analyzing at least one of an input image or a captured image and obtaining a recommended color distribution including at least one color based on the at least one of the input image or the captured image, wherein the captured image is obtained by capturing an image of an environment of the electronic apparatus;

displaying the input image on a display;

obtaining a hand image by capturing an image of a hand of a user and generating a magic hand comprising a color mapping by mapping a color to the obtained hand image based on the recommended color distribution; and detecting a gesture of the hand of the user and controlling processing of the input image displayed on the display based on the detected hand gesture and the color mapping of the magic hand.

12. The operating method of claim 11, further comprising obtaining the recommended color distribution based on the at least one of the input image or the captured image by using at least one neural network.

13. The operating method of claim 11, wherein the recommended color distribution comprises at least one of a color distribution obtained from the captured image, a color distribution obtained from the input image, or a color distribution obtained by reflecting the color distribution of the captured image to the color distribution obtained from the input image.

14. The operating method of claim 11, further comprising:

converting, based on the input image being a color image, the input image expressed in color into a black and white image; and displaying the black and white image.

15. The operating method of claim 11, further comprising performing an operation of at least one of modifying, adding, or removing at least one color mapped to the magic hand, according to a user input.

16. The operating method of claim 11, further comprising:

generating a plurality of magic hands; and displaying a plurality of preview images of the plurality of magic hands on the display, wherein the plurality of magic hands respectively correspond to different users.

17. The operating method of claim 16, further comprising:

detecting interaction gestures of hands of the different users respectively corresponding to the plurality of magic hands; and providing color effects to each of the plurality of magic hands displayed on the display according to the detected interaction gestures.

18. The operating method of claim 11, further comprising:

sharing, via screen sharing, the input image with an external apparatus that is remotely connected;

performing color control on at least a portion of the shared input image according to the hand gesture of the user of the electronic apparatus;

receiving a color display of at least another portion of the input image which has the colors that are controlled according to a hand gesture of the user of the external apparatus; and displaying the color display.

19. The operating method of claim 11, further comprising updating the magic hand by analyzing a feature of at least a partial region of the input image on which a picture is drawn, based on the gesture of the hand of the user, and modifying at least one color mapped to the magic hand based on the feature.

20. A non-transitory computer-readable recording medium having recorded thereon an operating method of an electronic apparatus, wherein the operating method of the electronic apparatus comprises:

analyzing at least one of an input image or a captured image and obtaining a recommended color distribution including at least one color based on at least one of the input image or the captured image, wherein the captured image is obtained by capturing an image of an environment of the electronic apparatus;

displaying the input image on a display;

obtaining a hand image by capturing an image of a hand of a user and generating a magic hand comprising a color mapping by mapping a color to the obtained hand image based on the recommended color distribution; and detecting a gesture of the hand of the user and controlling processing of the input image displayed on the display based on the detected hand gesture and the color mapping of the magic hand.

* * * * *